(12) United States Patent
Eguchi et al.

(10) Patent No.: US 8,035,781 B2
(45) Date of Patent: Oct. 11, 2011

(54) LIQUID CRYSTAL DISPLAY DEVICE

(75) Inventors: Shingo Eguchi, Tochigi (JP); Yuriko Tsuji, Tochigi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 604 days.

(21) Appl. No.: 11/672,992

(22) Filed: Feb. 9, 2007

(65) Prior Publication Data
US 2007/0126959 A1   Jun. 7, 2007

Related U.S. Application Data

(63) Continuation of application No. 10/375,017, filed on Feb. 28, 2003, now Pat. No. 7,212,265.

(30) Foreign Application Priority Data

Mar. 1, 2002 (JP) ................................ 2002-056295

(51) Int. Cl.
*G02F 1/1335* (2006.01)
(52) U.S. Cl. ...................................... 349/114; 349/113
(58) Field of Classification Search .................. 349/113, 349/114
See application file for complete search history.

(56) References Cited

U.S. PATENT DOCUMENTS

| | | | |
|---|---|---|---|
| 4,983,022 A | 1/1991 | Shannon |
| 5,136,351 A | 8/1992 | Inoue et al. |
| 5,193,017 A | 3/1993 | Iwai |
| 5,629,783 A | 5/1997 | Kanbara et al. |
| 5,753,937 A | 5/1998 | Shimomaki et al. |
| 5,869,362 A | 2/1999 | Ohtani |
| 6,011,274 A | 1/2000 | Gu et al. |
| 6,016,178 A | 1/2000 | Kataoka et al. |
| 6,064,456 A | 5/2000 | Taniguchi |
| 6,097,459 A | 8/2000 | Shimada |
| 6,122,027 A | 9/2000 | Ogawa |
| 6,195,140 B1 | 2/2001 | Kubo |
| 6,219,120 B1 | 4/2001 | Sasaki |
| 6,278,508 B1 | 8/2001 | Ogawa et al. |
| 6,295,109 B1 | 9/2001 | Kubo et al. |

(Continued)

FOREIGN PATENT DOCUMENTS

EP  0 829 748  3/1998

(Continued)

OTHER PUBLICATIONS

Office Action dated Dec. 26, 2008 for Application No. 200310006806.5 with full English translation, 13 pages.

(Continued)

*Primary Examiner* — David Nelms
*Assistant Examiner* — David Chung
(74) *Attorney, Agent, or Firm* — Fish & Richardson P.C.

(57) ABSTRACT

With an object of providing a transflective type liquid crystal display device having a transparent electrode of an uneven structure formed without particularly increasing steps, in fabricating the transflective type liquid crystal display device, a amorphous transparent conductive film is formed on a substrate, a crystalline portion is formed in the amorphous transparent conductive film to thereby form the transparent conductive film including the crystalline portion, a amorphous portion is removed at a film surface of the transparent conductive film including the crystalline portion to thereby form the transparent conductive film having an uneven shape formed by a remaining crystalline portion at a film surface and a reflecting electrode having the uneven shape is formed by forming a reflective conductive film above the transparent electrode having the uneven shape.

30 Claims, 17 Drawing Sheets

U.S. PATENT DOCUMENTS

| | | |
|---|---|---|
| 6,330,047 B1 | 12/2001 | Kubo et al. |
| 6,373,540 B1 | 4/2002 | Munakata |
| 6,392,735 B1 | 5/2002 | Tani |
| 6,407,784 B1 | 6/2002 | Kanou et al. |
| 6,417,898 B1 | 7/2002 | Izumi |
| 6,426,787 B1 | 7/2002 | Satake |
| 6,452,654 B2 | 9/2002 | Kubo et al. |
| 6,563,559 B2 | 5/2003 | Noritake |
| 6,603,455 B1 | 8/2003 | Zhang et al. |
| 6,618,107 B1 | 9/2003 | Tanaka |
| 6,639,639 B2 | 10/2003 | Baek |
| 6,649,936 B1 | 11/2003 | Sung |
| 6,657,688 B2 | 12/2003 | Nagata |
| 6,671,025 B1 * | 12/2003 | Ikeda et al. .................. 349/156 |
| 6,683,666 B1 | 1/2004 | Jang et al. |
| 6,690,437 B2 | 2/2004 | Yamazaki et al. |
| 6,697,138 B2 | 2/2004 | Ha |
| 6,717,632 B2 | 4/2004 | Ha |
| 6,727,965 B1 | 4/2004 | Kubota |
| 6,747,289 B2 | 6/2004 | Yamazaki et al. |
| 6,750,836 B1 | 6/2004 | Katayama et al. |
| 6,784,957 B2 | 8/2004 | Kanou |
| 6,784,959 B2 | 8/2004 | Noritake |
| 6,798,480 B2 * | 9/2004 | Ono et al. .................. 349/115 |
| 6,801,279 B2 | 10/2004 | Jang |
| 6,809,785 B2 * | 10/2004 | Fujino .................. 349/114 |
| 6,815,347 B2 | 11/2004 | Sumi |
| 6,819,379 B2 | 11/2004 | Kubo et al. |
| 6,872,658 B2 | 3/2005 | Arakawa et al. |
| 6,879,359 B1 | 4/2005 | Kikkawa et al. |
| 6,900,084 B1 | 5/2005 | Yamazaki |
| 6,912,021 B2 | 6/2005 | Kimura |
| 6,950,159 B2 | 9/2005 | Kubo et al. |
| 7,046,321 B2 | 5/2006 | Kikkawa et al. |
| 7,053,969 B2 | 5/2006 | Yamazaki et al. |
| 7,068,335 B2 | 6/2006 | Jang et al. |
| 7,071,912 B2 | 7/2006 | Zhang et al. |
| 7,102,165 B2 | 9/2006 | Yamazaki |
| 7,151,581 B2 | 12/2006 | Kubo et al. |
| 7,212,265 B2 | 5/2007 | Eguchi et |
| 7,277,143 B2 | 10/2007 | Funahata et al. |
| 7,335,593 B2 | 2/2008 | Arakawa et al. |
| 7,468,768 B2 | 12/2008 | Kubo et al. |
| 7,535,528 B2 | 5/2009 | Kubo et al. |
| 2001/0020991 A1 | 9/2001 | Kubo et al. |
| 2001/0026337 A1 | 10/2001 | Noritake |
| 2001/0048496 A1 | 12/2001 | Baek |
| 2001/0055082 A1 | 12/2001 | Kubo et al. |
| 2002/0033925 A1 | 3/2002 | Ito |
| 2003/0117552 A1 | 6/2003 | Chae |
| 2003/0160922 A1 | 8/2003 | Noritake |
| 2003/0164910 A1 | 9/2003 | Yamazaki |
| 2003/0164911 A1 | 9/2003 | Eguchi |
| 2003/0164912 A1 | 9/2003 | Eguchi |
| 2004/0196419 A1 | 10/2004 | Kanou |
| 2004/0218120 A1 | 11/2004 | Ikeno |
| 2005/0018118 A1 | 1/2005 | Kubo et al. |
| 2005/0270455 A1 | 12/2005 | Kubo et al. |
| 2006/0197883 A1 | 9/2006 | Yamazaki et al. |
| 2007/0001171 A1 | 1/2007 | Yamazaki |
| 2007/0002227 A1 | 1/2007 | Kubo et al. |
| 2007/0189391 A1 | 8/2007 | Shinbata |
| 2010/0120186 A1 | 5/2010 | Eguchi et al. |

FOREIGN PATENT DOCUMENTS

| | | |
|---|---|---|
| EP | 1113308 A1 | 7/2001 |
| JP | 55-103583 | 8/1980 |
| JP | 61-024102 | 2/1986 |
| JP | 06-148679 | 5/1994 |
| JP | 07-028073 | 1/1995 |
| JP | 08-78329 | 3/1996 |
| JP | 09-090352 | 4/1997 |
| JP | 11-101992 | 4/1999 |
| JP | 11-183892 | 7/1999 |
| JP | 11-281992 | 10/1999 |
| JP | 11-287989 | 10/1999 |
| JP | 2000-162590 | 6/2000 |
| JP | 2000-162625 | 6/2000 |
| JP | 2000-187209 | 7/2000 |
| JP | 2000-193996 | 7/2000 |
| JP | 2000-250067 | 9/2000 |
| JP | 2000-284305 | 10/2000 |
| JP | 2000-305099 | 11/2000 |
| JP | 2001-056466 | 2/2001 |
| JP | 2001-083494 | 3/2001 |
| JP | 2001-108984 | 4/2001 |
| JP | 2001-201768 | 7/2001 |
| JP | 2001183649 A | 7/2001 |
| JP | 2002-049057 | 2/2002 |
| JP | 2003-195349 | 7/2003 |
| KR | 2001-0031885 A | 4/2001 |
| KR | 2002-0096394 A | 12/2002 |

OTHER PUBLICATIONS

Office Action (Chinese Patent Application No. 03106806.5) mailed Jun. 27, 2008 with full English translation.

Office Action (Korean Patent Application No. 10-2003-0012601) mailed Jul. 23, 2009 with English translation, 8 pages.

* cited by examiner

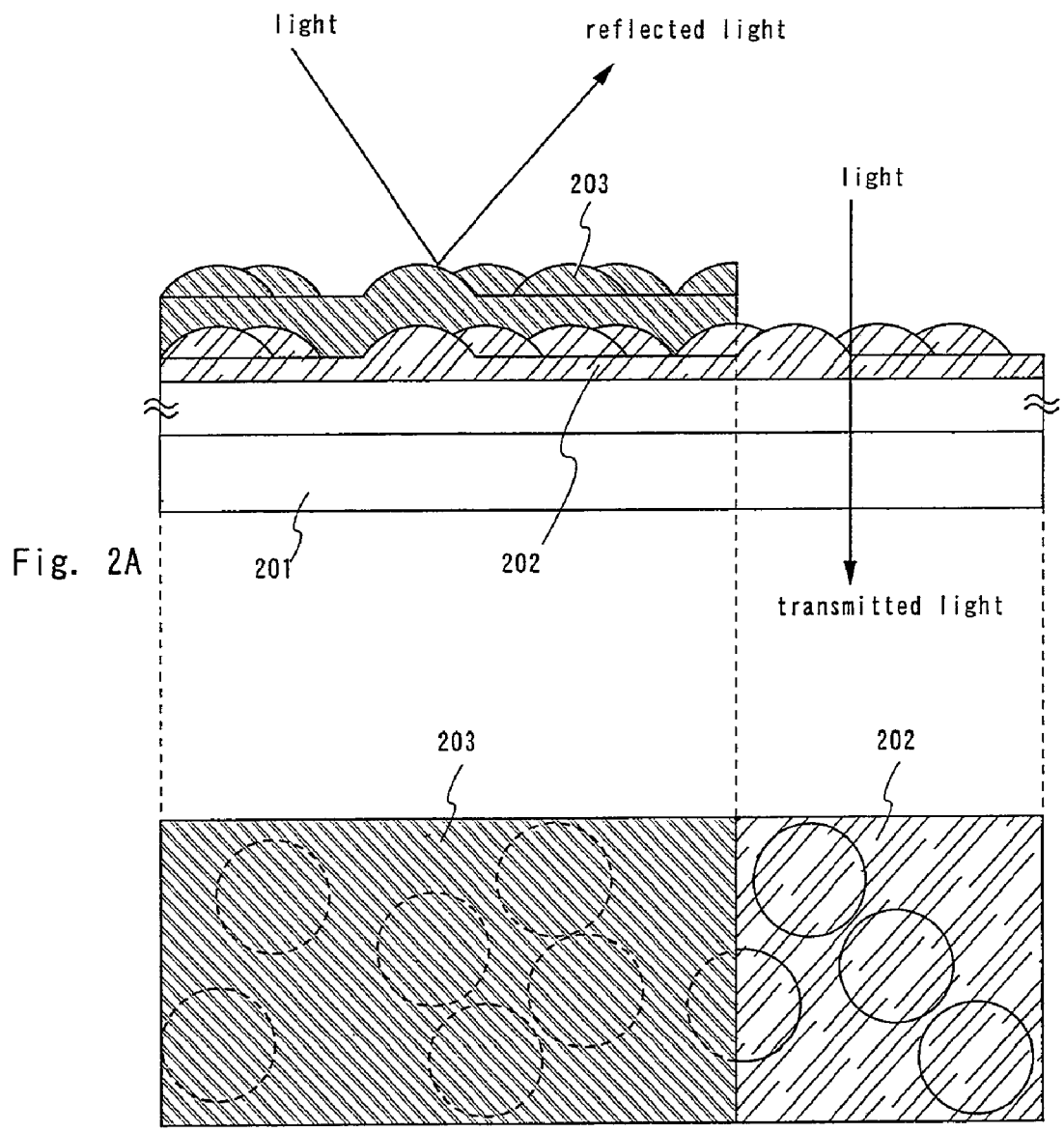

LIQUID CRYSTAL DISPLAY DEVICE

BACKGROUND OF THE INVENTION

1. Field of the Invention

The present invention relates to liquid crystal display device of a passive matrix type and an active matrix type. Particularly, the invention relates to an electrode structure of transflective type liquid crystal display device having both functions of a transmission type and a reflection type.

2. Description of the Related Art

In recent years, by explosive spread of a portable information terminal represented by a portable telephone, there is needed a display capable of dealing with light-weighted formation, conservation of power consumption and a change in an environment of use.

Further, in view of thin film formation and light-weighted formation, a liquid crystal display device or an organic EL display device is representatively promising.

Power consumption of a transmission type display device is inconsiderable for driving only a display. However, a liquid crystal per se does not emit light and therefore, a back light is needed for displaying as a display. For use of a portable telephone, an EL back light is generally used, however, power is separately needed for the back light and a characteristic of conservation of power consumption particularly to a liquid crystal is not fully utilized, which is disadvantageous in conservation of power consumption. Further, although in a dark environment, display of a display is viewed with excellent contrast, in an ordinary bright environment, the display is not viewed so well and there is a drawback in adaptability in accordance with the environment of use both in cases of an upper emitting type and a lower emitting type.

Further, the organic EL display device is characterized in that a display element per se emits light. Although power consumption thereof becomes larger than that of a reflection type liquid crystal display device, the power consumption is smaller than that of a transmission type liquid crystal display device (having back light). However, similar to the case of the transmission type liquid crystal display device, although in a dark environment, display of a display is viewed excellently, in an ordinary bright environment, the display is not viewed so well and therefore, there is still a drawback in adaptability in accordance with an environment of use both in cases of the upper emitting type and the lower emitting type.

Further, the reflection type liquid crystal display device utilizes outside light from an environment as light for display. On the side of the display, the back light is not basically needed, only power for driving a liquid crystal and a drive circuit is needed and therefore, positive conservation of power consumption is achieved. Further, quite contrary to the former two, although in a bright environment, display of a display is viewed excellently, in a dark environment, the display is not viewed so well. Considering the use of a portable information terminal, the portable information terminal is mainly used outdoors and there is frequently a case of viewing the display in a comparatively bright environment, however, this is still insufficient in terms of adaptability in accordance with an environment of use. Therefore, locally, a reflection type display device integrated with a front light is on sale such that the display can be carried out even in a dark environment.

Hence, attention is given to a transflective type liquid crystal display having advantages of both of a transmission type and a reflection type liquid crystal display device by combining the device. In a bright environment, a characteristic of the reflection type of conservation of power consumption and excellence in optical recognizing performance under the environment is utilized, meanwhile, in a dark environment, a characteristic of excellence in contrast provided to the transmission type is utilized by using a back light.

A transflective type liquid crystal display device is disclosed in JP11-101992. The device is a reflection and transmission type (transflective type) liquid crystal display device having a constitution which can be used as the reflection and transmission type liquid crystal display device in which by fabricating a reflecting portion for reflecting outside light and a transmitting portion for transmitting light from a back light to include in a single display panel, when a surrounding is totally dark, display is carried out by utilizing light transmitting through the transmitting portion from the back light and light reflected by the reflecting portion formed by a film having comparatively high reflectance and as a reflection type liquid crystal display device in which when outside light is bright, display is carried out by utilizing light reflected by the reflecting portion formed by the film having the comparatively high optical reflectance.

Further, the above-described transflective type liquid crystal display device is provided with a special uneven structure having optical diffusion performance particularly at the reflecting portion for carrying out display by reflection. Because a reflection electrode reflects light incident on a surface from a certain direction by a certain angle of incidence only to a location having a specific angle of emittance in a specific direction (Snell's law) in view of the structure and therefore, when the surface is flat, a direction and an angle of emitting light are determined to be constant relative to incidence of light. When a display is fabricated under such a state, a display having very poor optical recognizing performance is brought about.

The transflective type liquid crystal display device may be regarded as a display in corresponding well with a special condition of use of a portable information terminal. Particularly, in use thereof for a portable telephone, considerable demand is anticipated to promise in the future. Hence, in order to ensure stable demand or to meet enormous demand, there is apparently a need of achieving further reduction in cost.

However, in order to form the uneven structure shown above, there is needed a method of attaching an uneven shape at a layer below a reflection electrode and thereafter forming the reflection electrode thereabove.

Further, regardless of the above-described example, in order to fabricate a transflective type liquid crystal display device, patterning operation is needed for forming an uneven structure at either or both surfaces of a reflection electrode and a transmission electrode constituting a pixel electrode or at a layer below a pixel electrode and therefore, a number of steps is increased. An increase in the number of steps brings about a disadvantageous situation of a reduction in yield, extension in process time, or an increase in cost.

SUMMARY OF THE INVENTION

Hence, it is an object of the invention to provide a transflective type liquid crystal display device having a transparent electrode of an uneven structure formed without particularly increasing steps.

In order to resolve the above-described problem, in fabricating a transflective type liquid crystal display device, the invention is characterized in providing an uneven shape without particularly increasing a patterning step only for providing the uneven shape at a surface of a pixel electrode in the fabrication processing.

A liquid crystal display device of the invention is a liquid crystal display device characterized in comprising a transparent electrode and a reflecting electrode over a substrate, a transparent conductive film formed by forming a amorphous transparent conductive film over the substrate, forming a crystalline portion in the amorphous transparent conductive film to thereby form the transparent conductive film including the crystalline portion and removing an amorphous portion at a film surface of the transparent conductive film including the crystalline portion to thereby constitute an uneven shape formed by a remaining crystalline portion at the film surface, and a reflecting electrode provided by forming a reflective conductive film on the transparent conductive film having the uneven shape.

Further, in the above-described constitution, although the transparent conductive film including the crystalline portion can be formed by sintering (heating) the amorphous transparent conductive film, the transparent conductive film including the crystalline portion can also be formed by using other publicly-known method. Further, in removing the amorphous portion at the film surface of the transparent conductive film including the crystalline portion, there can be used a method of etching by coating an acidic solution on the surface of the transparent conductive film including the crystalline portion.

Further, by laminating to form the reflecting electrode comprising the reflective conductive film on the transparent electrode comprising the transparent conductive film having the uneven shape at the surface, the surface of the reflecting electrode is constituted by the uneven shape and therefore, the reflecting electrode is provided with a function of scattering incident light. Further, at a portion at which the reflecting electrode is not provided on the transparent electrode and the transparent electrode is exposed to surface, the transparent electrode having performance of transmitting light is constituted. Therefore, the invention is formed with a transflective type liquid crystal display device having the electrode having two kinds of properties of reflecting performance and transmitting performance as a pixel electrode. That is, the pixel electrode according to the invention comprises the reflecting electrode and the transparent electrode and is provided with the uneven shape.

Further, as the reflective conductive film according to the invention, there is used a conductive film having reflectance equal to or larger than 75% in the vertical reflection characteristic in a wavelength range of 400 through 800 nm (visible light region). As such a material, aluminum (Al) and silver (Ag) and an alloy material whose major component is constituted thereby can be used.

By using the above-described method, photolithography steps used in forming the uneven shape normally can be reduced and therefore, considerable cost reduction and promotion of productivity can be realized.

Further, a liquid crystal display device according to other constitution of the invention is a liquid crystal display device characterized in including a thin film transistor, a transparent conductive electrode and a reflective conductive electrode, wherein the transparent conductive electrode and the reflective conductive electrode are electrically connected to the thin film transistor via an insulating film, the transparent conductive electrode is formed by forming a amorphous transparent conductive film at a surface of the insulating film, forming a transparent conductive film including a crystalline portion by sintering the amorphous transparent conductive film and etching a surface of the transparent conductive film including the crystalline portion by an acidic solution to thereby constitute an uneven shape at the surface and the reflective conductive film is formed on the transparent conductive film having the uneven shape.

According to the constitution, by forming the reflective conductive film on the transparent electrode having the uneven shape, not only the reflecting electrode having the uneven shape is formed but also a wiring for electrically connecting the reflecting electrode and the thin film transistor can simultaneously be formed.

Further, the uneven shape of the surface of the transparent electrode is formed by a random shape and a random arrangement and electrically connected to the reflecting electrode formed successively.

Further, at a pixel portion, a rate of an area occupied by the reflective conductive film formed by laminating on the transparent conductive film for forming the transparent electrode is characterized to be 50 through 90% of an area of the pixel portion.

Further, a liquid crystal display device of the invention is a liquid crystal display device characterized in comprising: a first substrate comprising a first transparent conductive electrode and a reflective conductive electrode, a second substrate comprising a second transparent conductive electrode and a liquid crystal, wherein the first transparent conductive electrode is formed by forming an amorphous transparent conductive film on the substrate, forming a transparent conductive film including a crystalline portion by sintering the amorphous transparent conductive film and etching a surface of the transparent conductive film including the crystalline portion by an acidic solution to thereby constitute an uneven shape at the surface, the reflective conductive film is formed on the transparent conductive film having the uneven shape, a film forming face of the first substrate and a film forming face of the second substrate are arranged to be opposed to each other and the liquid crystal is interposed between the first substrate and the second substrate.

Further, a liquid crystal display device of the invention is a liquid crystal display device characterized in comprising a first substrate comprising a thin film transistor, a first transparent conductive electrode and a reflective conductive electrode, a second substrate comprising a second transparent conductive electrode and a liquid crystal, wherein the first transparent conductive electrode and the reflective conductive electrode are electrically connected to the thin film transistor via an insulating film, the first transparent conductive electrode is formed by forming an amorphous transparent conductive film at a surface of the insulating film, forming a transparent conductive film including a crystalline portion by sintering the amorphous transparent conductive film and etching the transparent conductive film including the crystalline portion by an acidic solution to thereby constitute an uneven shape at the surface, the reflective conductive film is formed on the transparent conductive film having the uneven shape, a film forming face of the first substrate and a film forming face of the second substrate are arranged to be opposed to each other and the liquid crystal is interposed between the first substrate and the second substrate.

According to the above-described respective constitutions, sintering of the amorphous transparent conductive film is carried out such that there is present a state in which the crystalline portion in which crystals grow by heating and the amorphous portion in which crystals are not formed yet are mixed. Specifically, although the amorphous transparent conductive film can be formed by sintering at 150° C. through 250° C., the amorphous transparent conductive film is more preferably sintered at 200° C. for 60 minutes.

Further, in the above-described respective constitutions, the amorphous portion at the surface of the transparent conductive film may be polished after sintering the amorphous transparent conductive film. Further, as a polishing method, other than public-known mechanical polishing method or chemical polishing method, a CMP method (chemical mechanical polishing) can be used.

Further, in the above-described respective constitutions, as acidic solution, strong acid of hydrofluoric acid, nitric acid, sulfuric acid, hydrochloric acid or the like may preferably be used. Further, by carrying out etching by coating the acidic solution on the transparent conductive film after the sintering treatment, a larger portion of the amorphous portion at the surface of the transparent conductive film is removed and the crystalline portion is made to remain.

By the above-described, the uneven shape by the transparent conductive film including the crystalline portion having a grain shape can be formed on the surface of the transparent conductive film.

BRIEF DESCRIPTION OF THE DRAWINGS

FIGS. 2A and 2B are views for explaining the uneven shape of the surface of the electrode according to the invention;

DETAILED DESCRIPTION OF THE PREFERRED EMBODIMENTS

Figure 1A:
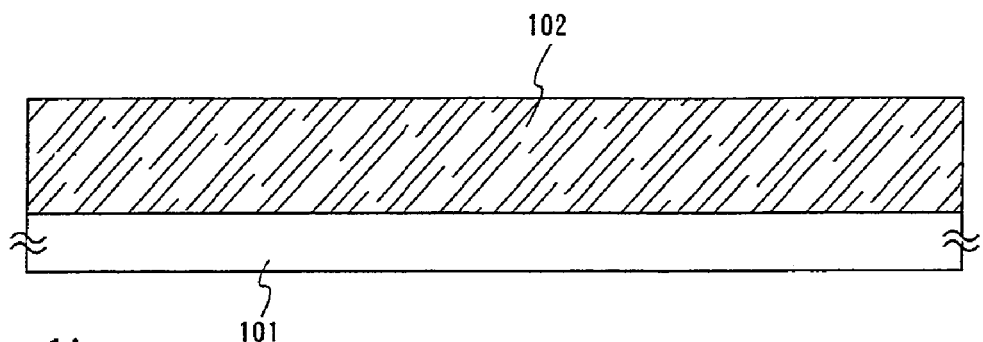
FIGS. 1A to 1D are views for explaining steps of fabricating an uneven shape on a surface of an electrode according to the invention.

An embodiment of the invention will be explained in reference to FIGS. 1A to 1D. An amorphous transparent conductive film 102 is formed over a substrate 101 (FIG. 1A).

Further, as a material for forming the transparent conductive film, a film of indium tin oxide (ITO) or a film of indium oxide mixed with 2 through 20 (%) of zinc oxide (ZnO) is used and the film is formed by a film thickness of 100 through 200 nm.

Figure 1B:
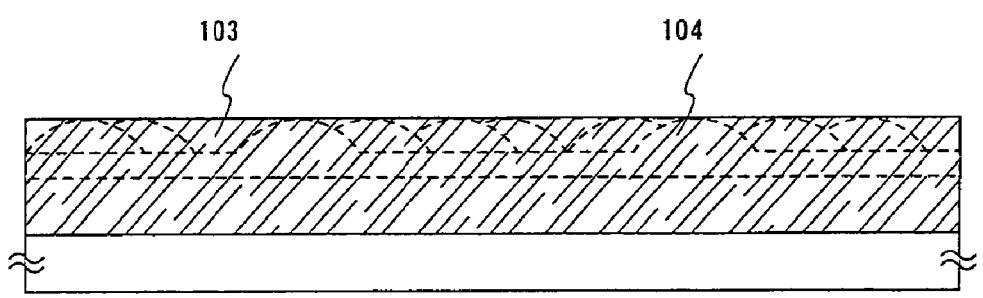

Next, by sintering the amorphous transparent conductive film 102 at 200° C. for 60 minutes, a portion of the transparent conductive film is crystallized. Thereby, in the sintered transparent conductive film, an amorphous state at a region a103 and a crystalline state at a region b104 are mixed (FIG. 1B).

In the state, a surface of the transparent conductive film is polished. As a polishing method, the surface can be polished also by using a CMP method other than publicly known mechanical polishing method or chemical polishing method. Further, by polishing the surface of the transparent conductive film here, grains in the crystalline state can be exposed at the surface of the film. This is because comparing the amorphous state and the crystalline state, since the crystalline state is provided with a crystalline structure, a polishing rate of the crystalline state is smaller than that of the amorphous state. Therefore, there is an advantage of facilitating to form an uneven shape of the film surface of the transparent conductive film in later processings, however, according to the invention, the polishing processing is not necessarily needed to carry out and therefore, the polishing processing may be omitted.

Figure 1C:
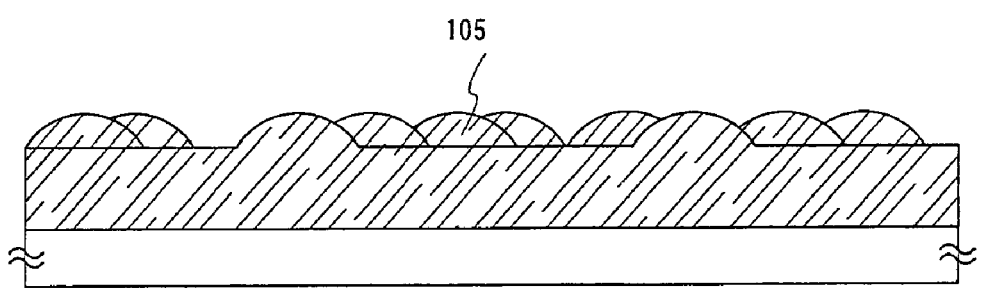

Next, by coating an acidic solution on the film surface of the transparent conductive film mixed with the amorphous state and the crystalline state, at the surface of the film, only the portion of the crystalline state can be made to remain and the portion of the amorphous state can be removed. Further, as the acidic solution, hydrofluoric acid, nitric acid, sulfuric acid or hydrochloric acid can be used. By making grains in the crystalline state remain on the film surface of the transparent conductive film by the acidic solution in this way, an uneven shape can be formed on the film surface of the transparent conductive film. That is, the uneven shape can be formed on the film surface by a transparent conductive film 105 including the crystalline state (FIG. 1C).

Figure 12A:
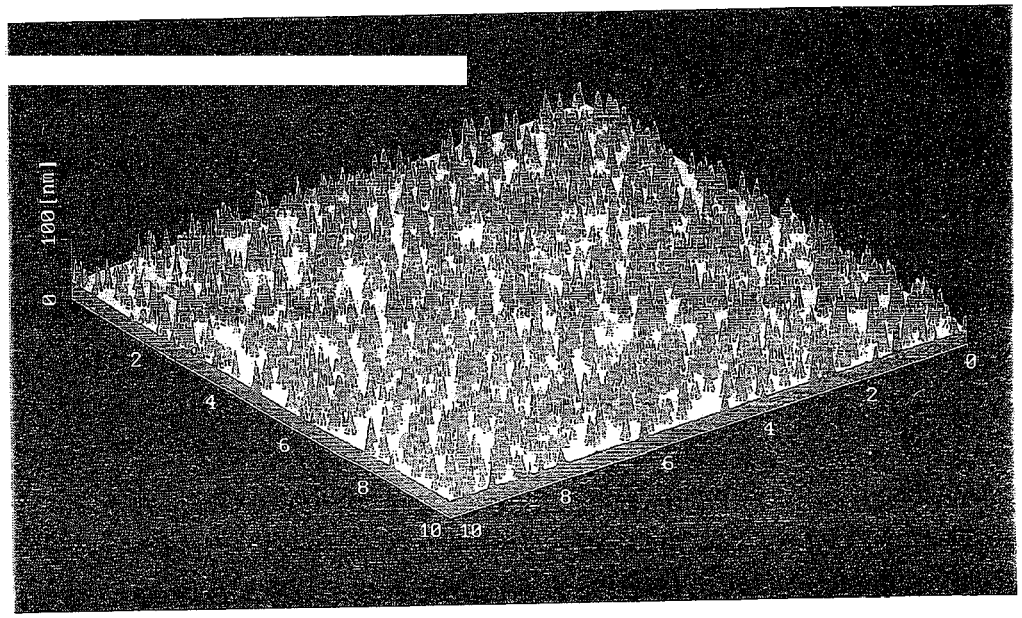
FIGS. 12A and 12B are AFM photographs of a surface of a transparent conductive film.
Figure 12B:
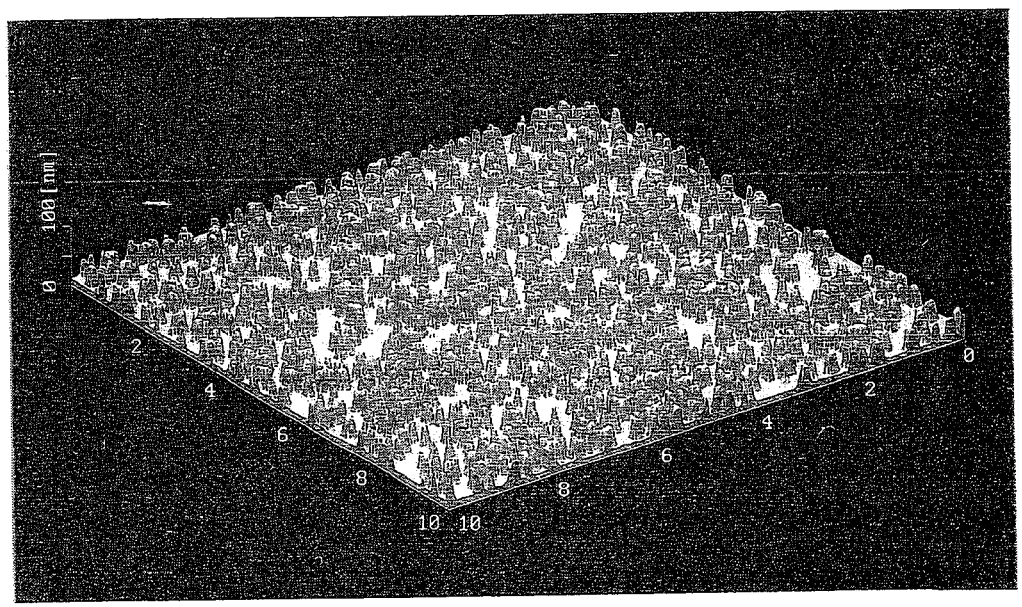

Further, FIGS. 12A and 12B show a behavior of the surface of the transparent conductive film having the uneven shape by the above-described processing. FIG. 12A shows a result of observing, by AFM (atomic force microscope), a substrate in which an ITO film formed as an amorphous transparent conductive film is sintered at 200° C. for 60 minutes and processed by 0.5% of hydrofluoric acid for 5 sec and FIG. 12B shows a result of observing, by AFM, a substrate in which an ITO film is sintered at 200° C. for 60 minutes, thereafter polished by CMP and processed by 0.5% hydrofluoric acid for 5 sec. When both samples are compared, a behavior of having an uneven shape on the surface of the ITO film is observed in both samples, it is known that the sample of FIG. 12B interposing the CMP processing is provided with a more rounded (convex) shape at a projection of the surface. By the rounded shape, a slope distribution of the uneven shape (convex and concave) can be made wider and therefore, according to the invention, it is the more preferable processing to interpose the CMP processing.

Figure 13A:
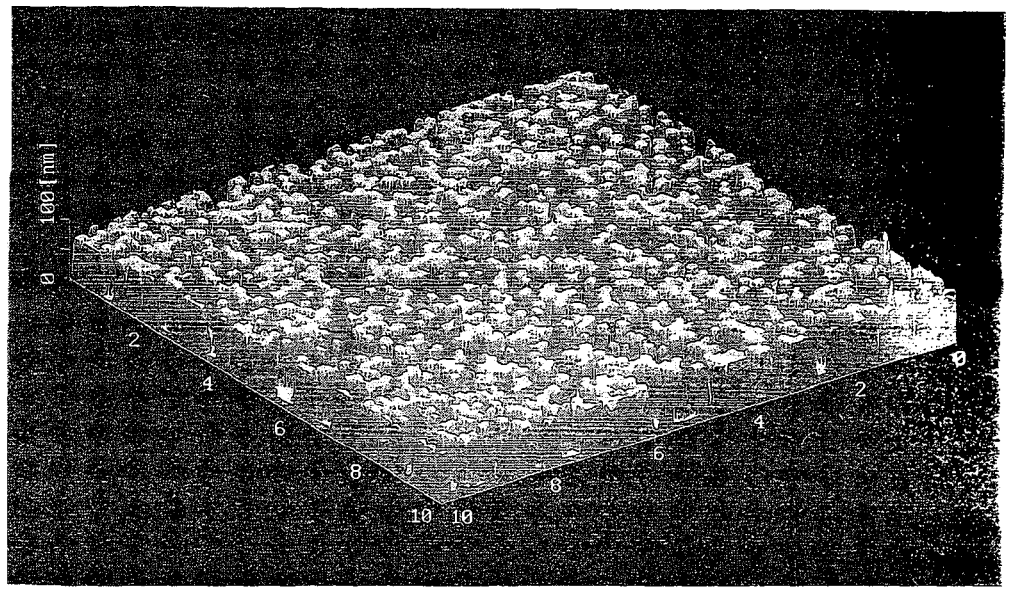
FIGS. 13A and 13B are AFM photographs of a surface of a transparent conductive film.
Figure 13B:
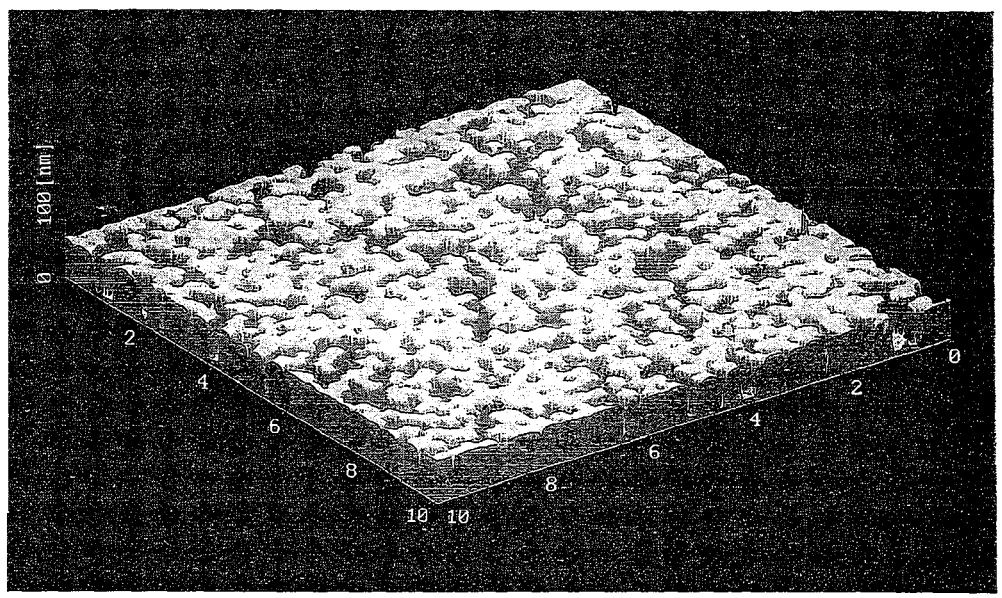

Further, FIGS. 13A and 13B show a result of observing a case in which a time period of processing by hydrofluoric acid differs from that of FIGS. 12A and 12B. Further, FIG. 13A shows a result of observing, by AFM, a substrate in which an ITO film formed as an amorphous transparent conductive film is sintered at 200° C. for 60 minutes and processed by 0.5% hydrofluoric acid for 15 sec and FIG. 13B shows a result of observing, by AFM, a substrate in which an ITO film is sintered at 200° C. for 60 minutes, thereafter polished by CMP and processed by 0.5% of hydrofluoric acid for 15 sec.

Comparing the surface of the ITO film shown in FIGS. 13A and 13B and the surface of the ITO film shown in FIGS. 12A and 12B, the surface is more flattened in the case of FIGS. 13A and 13B showing the result of processing the ITO film by 0.5% hydrofluoric acid for 15 sec than the case of FIGS. 12A and 12B showing a result of processing the ITO film by 0.5% of hydrofluoric acid for 5 sec. Therefore, although according to the invention, the uneven shape can be formed by carrying out the processing by hydrofluoric acid for 15 sec or less, it is more preferable to carry out the processing for 5 sec to provide an excellent scattering characteristic by a reflecting film formed later thereabove.

Figure 14A:
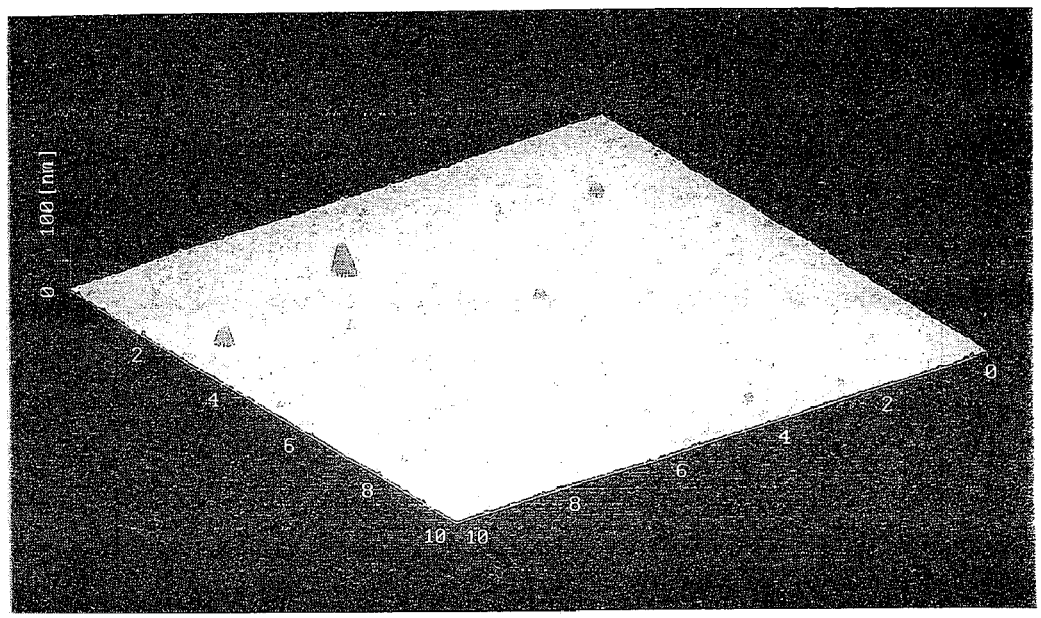
FIGS. 14A and 14B are AFM photographs of a surface of a transparent conductive film.
Figure 14B:
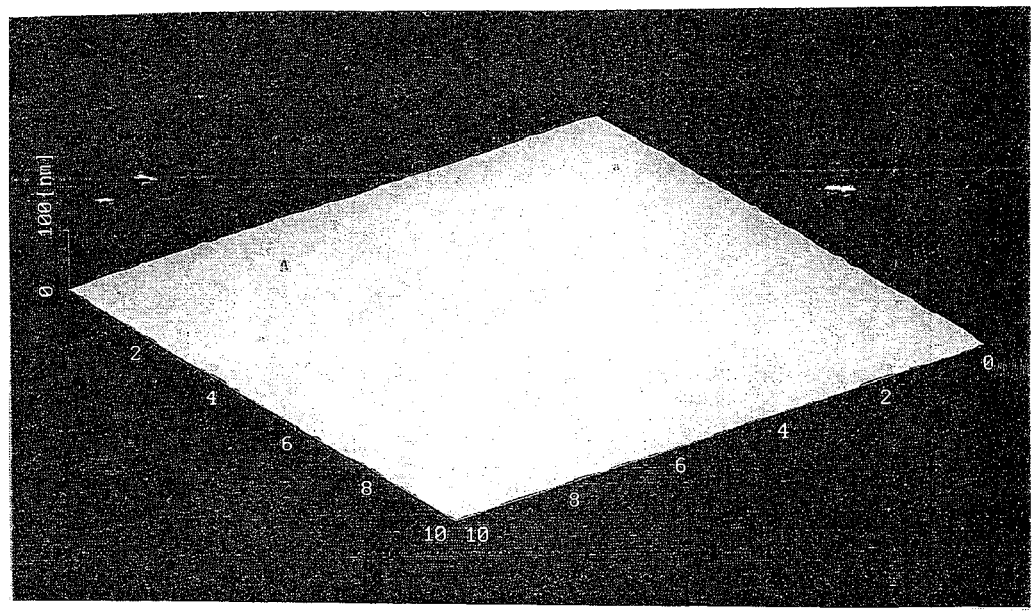

Further, comparing FIGS. 14A and 14B and FIGS. 12A and 12B, FIG. 14A shows a result of observing, by AFM, a substrate in which temperature of sintering an ITO film formed as an amorphous transparent conductive film is changed to 250° C., the ITO film is sintered at 250° C. for 60 minutes and thereafter, processed by 0.5% hydrofluoric acid for 5 sec and FIG. 14B shows a result of observing, by AFM, a substrate in which an ITO film is sintered at 250° C. for 60 minutes, thereafter polished by CMP and processed by 0.5% hydrofluoric acid for 5 sec.

Comparing the surface of the ITO film shown by FIGS. 14A and 14B and the surface of the ITO film shown by FIGS. 12A and 12B, it is known that the ITO surface in FIGS. 14A and 14B is provided with almost no unevenness. It seems that by sintering the ITO film at 200° C. for 60 minutes, the crystalline state and the amorphous state are formed on the surface of the ITO film and therefore, when the processing by hydrofluoric acid is carried out, only the portion in the crystalline state is left to form unevenness, however, by sintering the ITO film at 250° C. for 60 minutes, almost all of the surface of the ITO film is brought into the crystalline state and therefore, even when the surface is processed by hydrofluoric acid, the surface is hardly removed and therefore, unevenness cannot be formed.

As described above, the invention is achieved by sintering an ITO film formed as an amorphous transparent conductive film at 200° C. for 60 minutes and processing the ITO film by 0.5% hydrofluoric acid for 5 sec. Further, it is more preferable to carry out the CMP method before carrying out the processing by hydrofluoric acid.

Next, a reflective conductive film 106 is formed on the transparent conductive film 105 including the crystalline state. Further, although the reflective conductive film 106 is formed to overlap the transparent conductive film including the crystalline state formed therebefore, according to the invention, since a transflective type liquid crystal display device can be formed by forming a pixel electrode by combining a transparent electrode comprising the transparent conductive film 105 including the crystalline state and a reflecting electrode comprising the reflecting conductive film 106, the reflecting conductive film 106 is formed at a pixel portion to constitute 50 through 90% of an area occupied by the transparent conductive film 105 including the crystalline state (FIG. 1D).

Further, by forming the reflective conductive film 106 on the transparent conductive film 105 including the crystalline state having the uneven shape, a film surface of the reflecting conductive film 106 can also be constituted by an uneven shape. In this way, the reflective conductive film having the uneven shape can be formed without using a special photolithography step for forming the uneven shape. Further, by constituting the film surface of the reflective conductive film 106 by the uneven shape, a function of scatting light incident on the surface can be achieved.

Further, FIG. 2A shows a partial sectional view of a transparent electrode and a reflecting electrode according to the invention and FIG. 2B is a partial top view shown in correspondence with FIG. 2A.

Figure 1D:
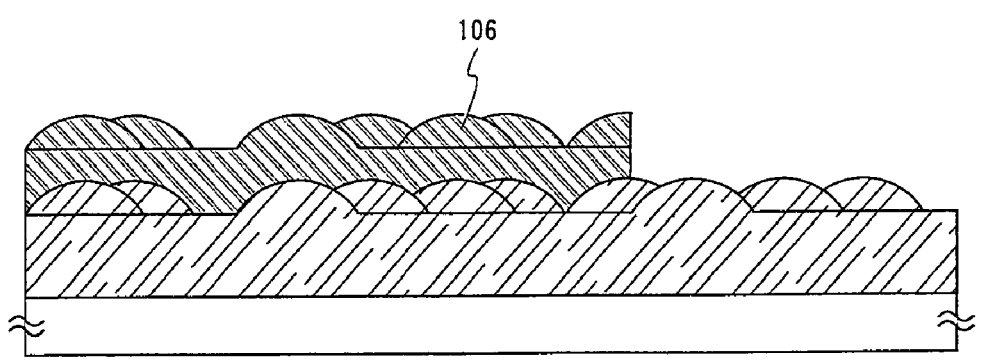

As shown by FIGS. 2A and 2B, according to the structure of the invention, a reflecting electrode 203 comprising the reflective conductive film 106 is formed on a transparent electrode 202 comprising the transparent conductive film 105 including the crystalline state shown by FIG. 1D above a substrate 201.

Further, although light incident on the reflecting electrode 203 is scattered by constituting reflected light by the uneven shape on the surface of the reflecting electrode 203, light incident on a portion at which the reflecting electrode 203 is not formed and the transparent electrode 202 is exposed, can constitute transmitting light to transmit through the transparent electrode 202 and can be emitted to a side of the board 201. Therefore, according to the structure of the invention, optical recognizing performance of a display can be promoted without increasing a TFT process.

Further, a transflective type liquid crystal display device can be formed by coupling an element substrate (FIG. 10) having a TFT above a substrate explained in the embodiment and an opposed substrate, not illustrated, having an opposed electrode by facing electrode forming faces thereof to each other and providing liquid crystals therebetween.

EXAMPLES

Examples of the invention will be explained as follows.

Example 1

According to the example, an example of steps of fabricating an active matrix substrate having a top gate type TFT will be shown. Further, FIG. 3A through FIG. 7 showing top views and sectional views of a portion of a pixel portion will be used for explanation.

First, an amorphous semiconductor layer is formed on a substrate 301 having an insulating surface. Here, a quartz substrate is used as the substrate 301 and an amorphous semiconductor layer is formed by a film thickness of 10 through 100 nm.

Further, a glass substrate or a plastic substrate can be used other than the quartz substrate. When the glass substrate is used, the glass substrate may be subjected to a heat treatment previously at a temperature lower than a glass strain point by about 10 through 20° C. Further, a base film comprising an insulating film of a silicon oxide film, a silicon nitride film or a silicon oxynitride film may be formed on a surface of the substrate 301 for forming TFT to prevent an impurity from diffusing from the substrate 301.

As the amorphous semiconductor layer, an amorphous silicon film having a film thickness of 60 nm is formed by LPCVD method. Successively, the amorphous semiconductor layer is crystallized. Here, the amorphous semiconductor layer is crystallized by using a technology described in JP8-78329. According to the technology described in the publication, a amorphous silicon film is selectively added with a metal element for helping to crystallize the amorphous silicon film and a heating treatment is carried out to thereby form a crystalline silicon film spreading by constituting an onset by an added region. Here, nickel is used as a metal element for helping the crystallization and after heat treatment for dehydrogenation (450° C., 1 hour), a heat treatment for crystallization (600° C., 12 hours) is carried out. Further, although the technology described in the publication is used here for the crystallization, the invention is not particularly limited to the technology but a publicly known crystallizing processing (laser crystallizing method, thermal crystallizing method) can be used.

Further, as necessary, laser beam (XeCl: wavelength 308 nm) is irradiated in order to increase a crystallization rate and repairing a defect which remains in a crystal grain. As the laser beam, excimer laser beam, or second harmonic or third harmonic of YAG laser having a wavelength equal to or smaller than 400 nm is used. At any rate, pulse laser beam having a repeating frequency of about 10 through 1000 Hz may be used and the laser beam may be focused to 100 through 400 mJ/cm$^2$ by an optical system, irradiated by 90 through 95% of an overlap rate and scanned on a surface of a silicon film.

Successively, Ni is gettered from a region constituting an active layer of TFT. Here, as a gettering method, an example of using a semiconductor layer including a rare gas element will be shown. In addition to an oxide film formed by irradiating the laser beam, a barrier layer comprising an oxide film of a total of 1 through 5 nm is formed by processing a surface for 120 seconds by ozone water. Successively, an amorphous silicon film including argon element constituting a gettering site is formed on the barrier layer by a sputtering method by a film thickness of 150 nm. According to film forming conditions by the sputtering method of the example, film forming pressure is set to 0.3 Pa, a flow rate of gas (Ar) is set to 50 (sccm), film forming power is set to 3 kW and substrate temperature is set to 150° C. Further, atomic concentration of argon element included in the amorphous silicon film falls in a range of $3\times10^{20}$/cm$^3$ through $6\times10^{20}$/cm$^3$ and atomic concentration of oxygen falls in a range of $1\times10^{19}$/cm$^3$ through $3\times10^{19}$/cm$^3$ under the above-described conditions. Thereafter, gettering is carried out by a heat treatment at 650° C. for 3 minutes by using a lamp annealing device. Further, an electric furnace may be used in place of the lamp annealing device.

Successively, by constituting an etching stopper by the barrier layer, the amorphous silicon film including argon element constituting the gettering side is selectively removed and thereafter, the barrier layer is selectively removed by diluted hydrofluoric acid. Further, in gettering, since nickel tends to move to a region having a high oxygen concentration, a barrier layer comprising an oxide film may preferably be removed after gettering.

After forming a thin oxide film on a surface of a silicon film (also referred to as polysilicon film) having the provided crystalline structure by ozone water, a mask comprising a resist is formed, the silicon film is etched to a desired shape and a semiconductor layer 305 separated in an island-like shape is formed. After forming the semiconductor layer 305, the mask comprising the resist is removed, a gate insulating film 306 covering the semiconductor layer 305 is formed by a film thickness of 100 nm and thereafter, thermal oxidation is carried out.

Successively, a channel doping step of adding a P-type or an N-type impurity element to a region for constituting a channel region of TFT at a low concentration is carried out over an entire face thereof or selectively. The channel doping step is a step of controlling threshold voltage of TFT. Further, as an impurity element for providing P-type to a semiconductor, elements of 13-th group of the periodic law such as boron (B), aluminum (Al) or gallium (Ga) are known. Further, as impurity elements for providing n-type to a semiconductor, elements belonging to 15-th group of the periodic law, typically, phosphor (P) and arsenic (As) are known. Further, here, boron is added by a plasma-exciting ion doping method without subjecting dibolane (B$_2$H$_6$) to mass separation. Naturally, an ion implantation method for carrying out mass separation may be used.

Successively, a first conductive film is formed and patterned to thereby form a gate electrode 307 and a capacitance wiring 308. A laminated structure of tantalum nitride (TaN) (film thickness 30 nm) and tungsten (film thickness 370 nm) is used. Here, a double gate structure is constituted in the example. Further, storage capacitor is constituted by the capacitance wiring 308 and a region a (305a) constituting a portion of the semiconductor layer 305 by constituting a dielectric body by the gate insulating film 306.

Next, phosphor is added at low concentration self-adjustingly by constituting a mask by the gate electrode 307 and the capacitance wiring 308. Concentration of phosphor at the region added with phosphor at low concentration is controlled to fall in a range of $1\times10^{16}$ through $5\times10^{18}$/cm$^3$, representatively, $3\times10^{17}$ through $3\times10^{18}$/cm$^3$.

Next, a mask (not illustrate) is formed and phosphor is added at high concentration to thereby form a high concentration impurity region for constituting a source region 302 or a drain region 303. Concentration of phosphor at the high concentration impurity region is controlled to fall in a range of $1\times10^{20}$ through $1\times10^{21}$/cm$^3$ (representatively, $2\times10^{20}$ through $5\times10^{20}$/cm$^3$). Further, a region of the semiconductor layer 305 overlapping the gate electrode 307 becomes a channel forming region 304 and a region thereof covered by the mask becomes a low concentration impurity region to constitute an LDD region 311. Further, a region which is not covered by any of the gate electrode 307, the capacitance wiring 308 and the mask becomes the high concentration impurity region including the source region 302 and the drain region 303.

Further, according to the example, TFT of the pixel portion and TFT of a drive circuit are formed on the same substrate and in TFT of the drive circuit, a low concentration impurity region having an impurity concentration lower than those of source and drain regions may be provided between a source and a drain region on both sides of a channel forming region or the low concentration impurity region may be provided on one side thereof. However, it is not necessarily needed to provide the low concentration impurity region on the both sides and a person carrying out the example may pertinently design a mask.

Next, although not illustrated here, in order to form a p-channel type TFT used in a drive circuit formed on a substrate the same as that of a pixel, a region for constituting an n-channel type TFT is covered by a mask, boron is added and a source region or a drain region is formed.

Figure 3A:
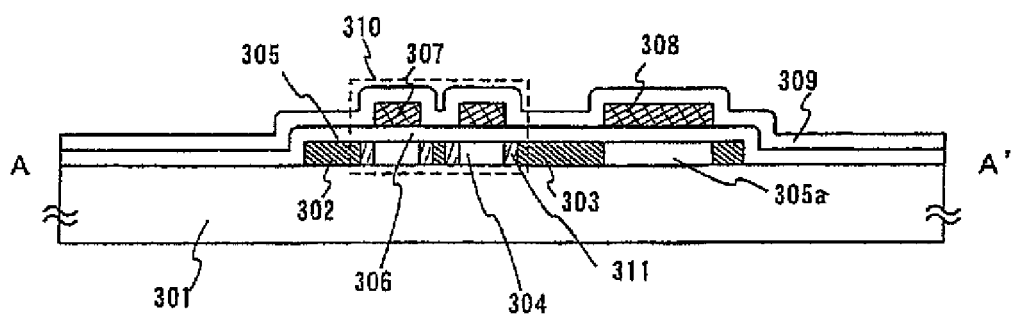
FIGS. 3A to 3D are views for explaining steps of fabricating a liquid crystal display device according to the invention.
Figure 4:
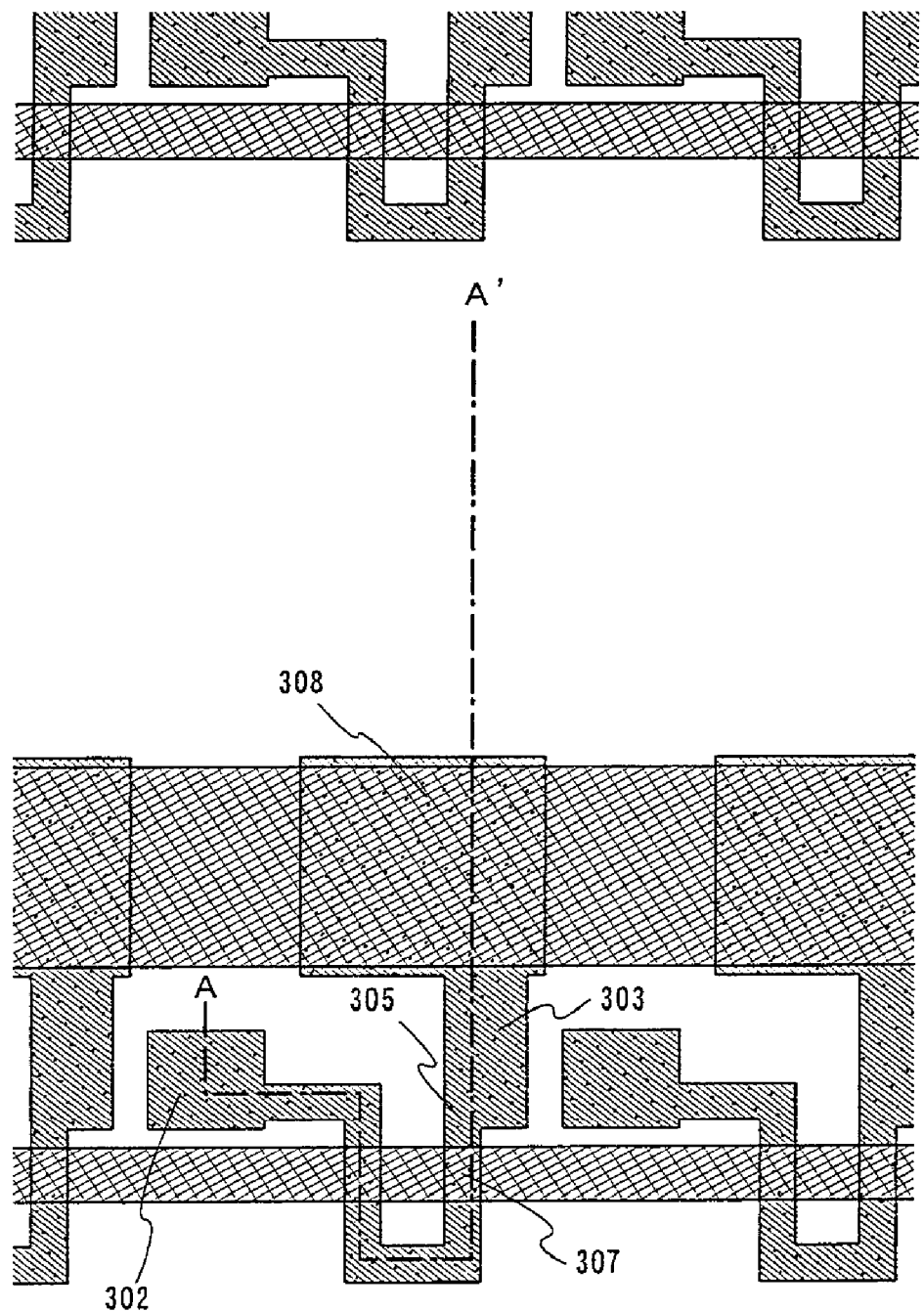
FIG. 4 is a view for explaining a step of fabricating the liquid crystal display device according to the invention.

Next, after removing the mask, a first insulating film 309 for covering the gate electrode 307 and the capacitance wiring 308 is formed. Here, a silicon oxide film is formed by a film thickness of 50 nm and a heat treatment step of activating an n-type or a p-type impurity element added to the semiconductor layer 305 by respective concentrations is carried out. Here, a heating treatment at 850° C. for 30 minutes is carried out (FIG. 3A). Further, FIG. 4 shows a top view of a pixel in this case. A sectional view by a dotted line A-A' in FIG. 4 corresponds to FIG. 3A.

Figure 3B:
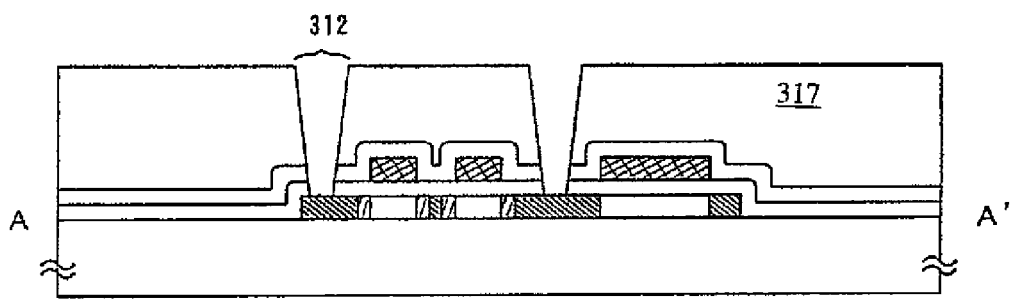
Figure 5:
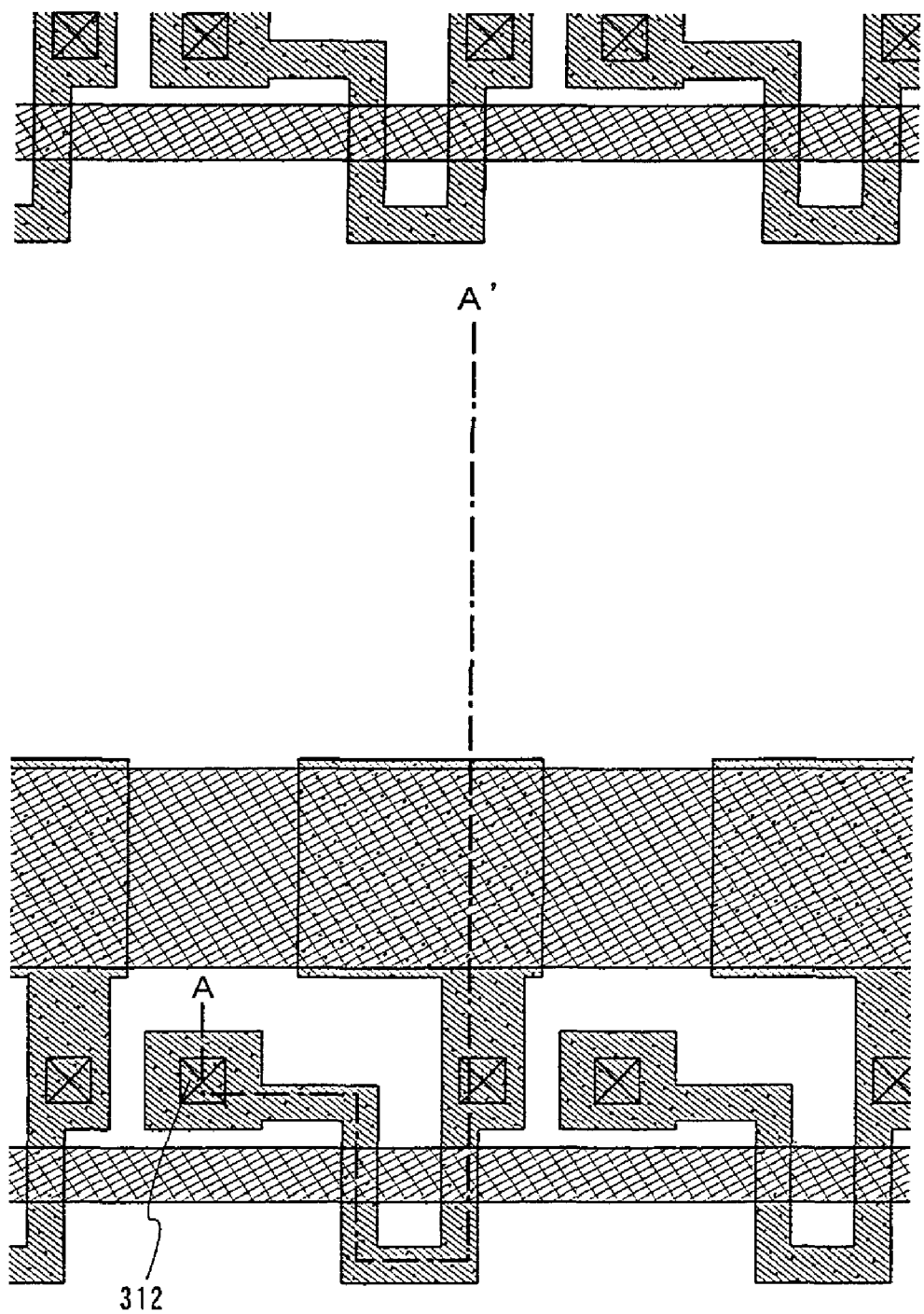
FIG. 5 is a view for explaining a step of fabricating the liquid crystal display device according to the invention.

Next, after carrying out hydrogenation treatment, a second insulating film 317 comprising an organic resin material is formed. Here, a surface of the second insulating film 317 can be flattened by using an acrylic resin film having a film thickness of 1 μm. Thereby, influence of stepped difference produced by the pattern formed at the layer below the second insulating film 317 can be prevented. Successively, a mask is formed above the second insulating film 317 and a contact hole 312 reaching the semiconductor layer 305 is formed (FIG. 3B). Further, after forming the contact hole 312, the mask is removed. Further, FIG. 5 shows a top view of the pixel in this case. In FIG. 5, a sectional view cut by a dotted line A-A' corresponds to FIG. 3B.

Next, a transparent conductive film (here, indium tin oxide (ITO) film) in an amorphous state of 120 nm is formed by a sputtering method and thereafter, a heating treatment at 200° C. for 60 minutes is carried out by a clean oven. Thereby, the amorphous state and the crystalline state can be mixed in a formed amorphous transparent conductive film. The film is patterned in a rectangular shape by using a photolithography technology. Further, after carrying out a wet etching treatment, the mask is removed.

Next, the surface of the transparent conductive film is polished by a CMP method. Here, a treatment is carried out by utilizing the fact that the polishing rate significantly differs between the amorphous portion and the crystalline portion mixed in the ITO film and therefore, grains in the crystalline state present at the surface of the transparent conductive film can be made to remain and a portion in the amorphous state can particularly be removed selectively.

According to the embodiment, a polishing pad (in the specification, hereinafter, generally referred to as pad) is pasted on a platen or a polishing plate, a polishing face of the substrate is pressed to the pad on the platen by certain constant pressure and the platen and the substrate are rotated or rocked respectively by supplying slurry between the ITO film formed above the substrate and the pad to thereby polish the surface of the work or the surface of the ITO film by chemical and mechanical composite operation. Further, as the slurry, ammonia water including silica abrasive grains having a grain size of about 120 nm is used and supplied by a flow rate of 100 cc/min. Further, a revolution number of the platen is set to 30 rpm, a revolution number of the substrate is set to 30 rpm, polishing pressure in polishing is set to 300 g/cm$^2$ and the polishing is carried out by a polishing time period of 0.3 min.

Next, etching is carried out by coating an acidic solution on the surface of the transparent conductive film. Further, in the example, as the acidic solution, 0.5% hydrofluoric acid is used and the chemical solution is coated by a spin coating method to thereby carry out the etching. Further, although as a time period of etching by the chemical solution, etching can be carried out for 15 sec or shorter, according to the embodiment, the time period is set to 5 sec. Further, the acidic solution is removed by cleaning the surface of the substrate by using pure water.

Figure 3C:
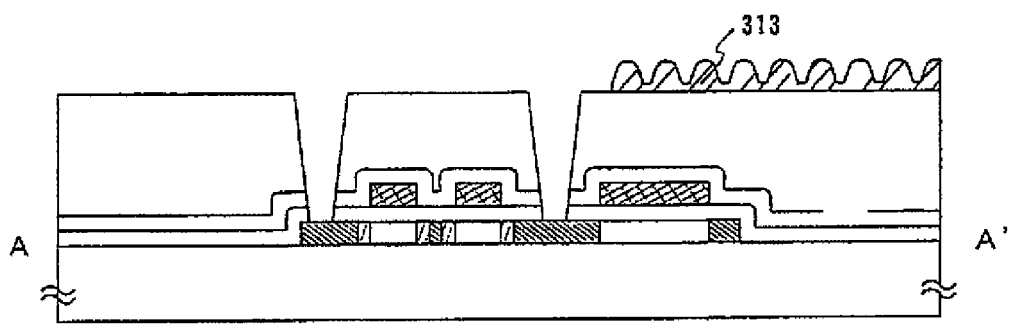
Figure 6:
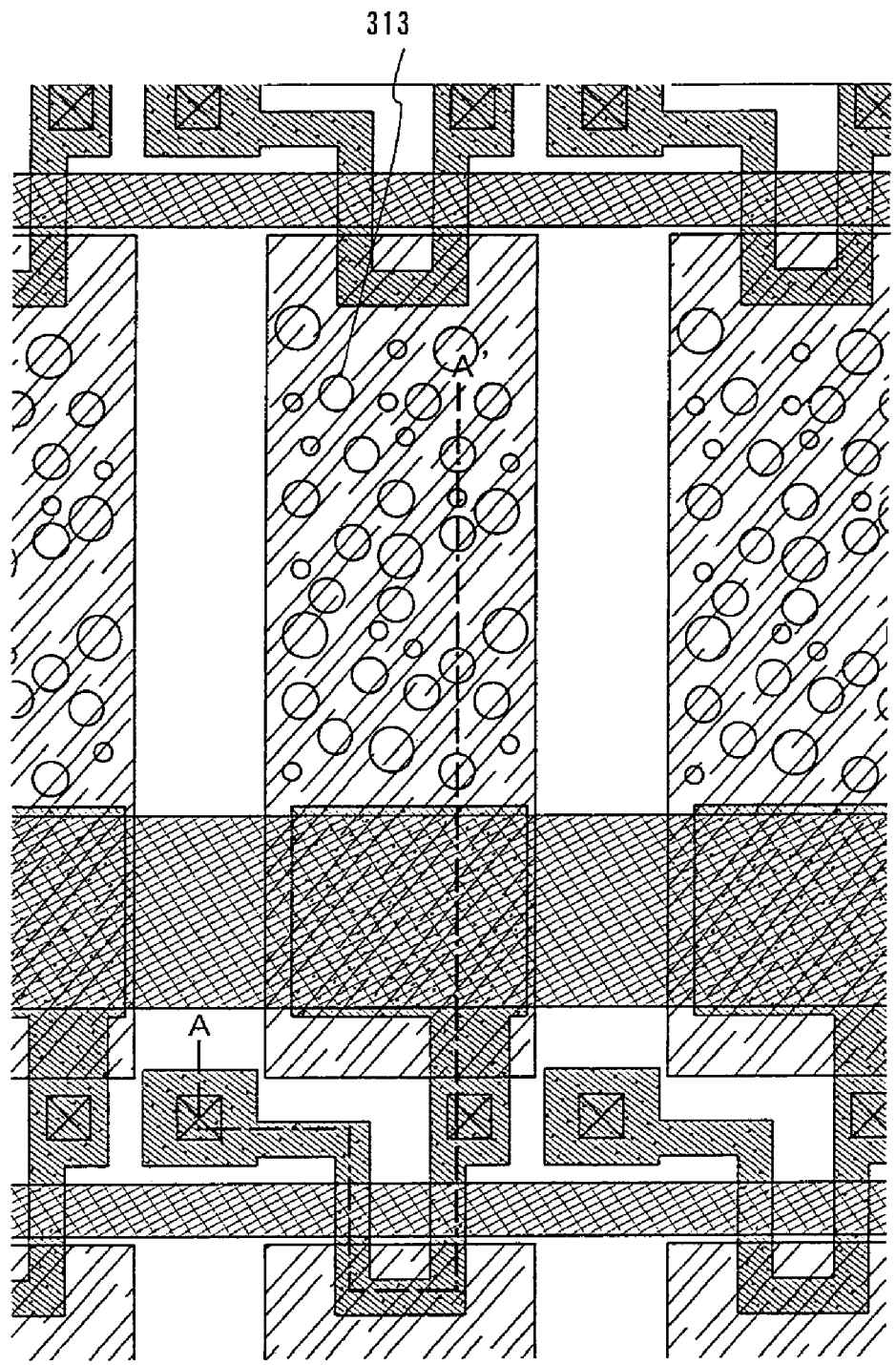
FIG. 6 is view for explaining a step of fabricating the liquid crystal display device according to the invention.

Thereby, a transparent electrode 313 comprising a transparent conductive film having an uneven shape can be formed at the surface (FIG. 3C). Further, FIG. 6 shows a top view of the pixel in this case. In FIG. 6, a sectional view cut by a dotted line A-A' corresponds to FIG. 3C.

Next, by forming a second conductive film and patterning the second conductive film, other than a reflecting electrode 314 formed on the transparent electrode 313, a wiring 315 constituting a source line and wiring 316 for electrically connecting TFT 310 and the transparent electrode 313 are formed. Further, the second conductive film formed here is a reflective conductive film for forming a reflecting electrode according to the invention and it is preferable to use aluminum, silver or an alloy metal whose major component is formed thereby.

According to the embodiment, as the second conductive film, a laminated film of a two-layered structure continuously formed with a Ti film by 50 nm and an aluminum film including Si by 500 nm by a sputtering method is used.

Further, a photolithography technology is used as a method of patterning and the reflecting electrode 314 and the wirings 315 and 316 are formed at positions overlapping the transparent electrode 313. Further, as an etching method used here, the dry etching method is used. Further, since the liquid crystal display device according to the invention is a transflective type liquid crystal display device, an area of the reflecting electrode 314 formed to overlap the transparent electrode 313 is constituted by 50 through 90% of an area occupied by the transparent electrode 313.

Figure 3D:
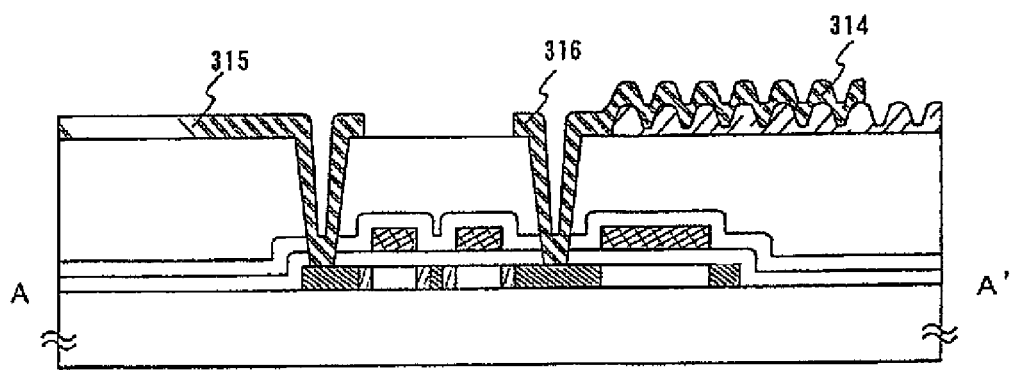
Figure 7:
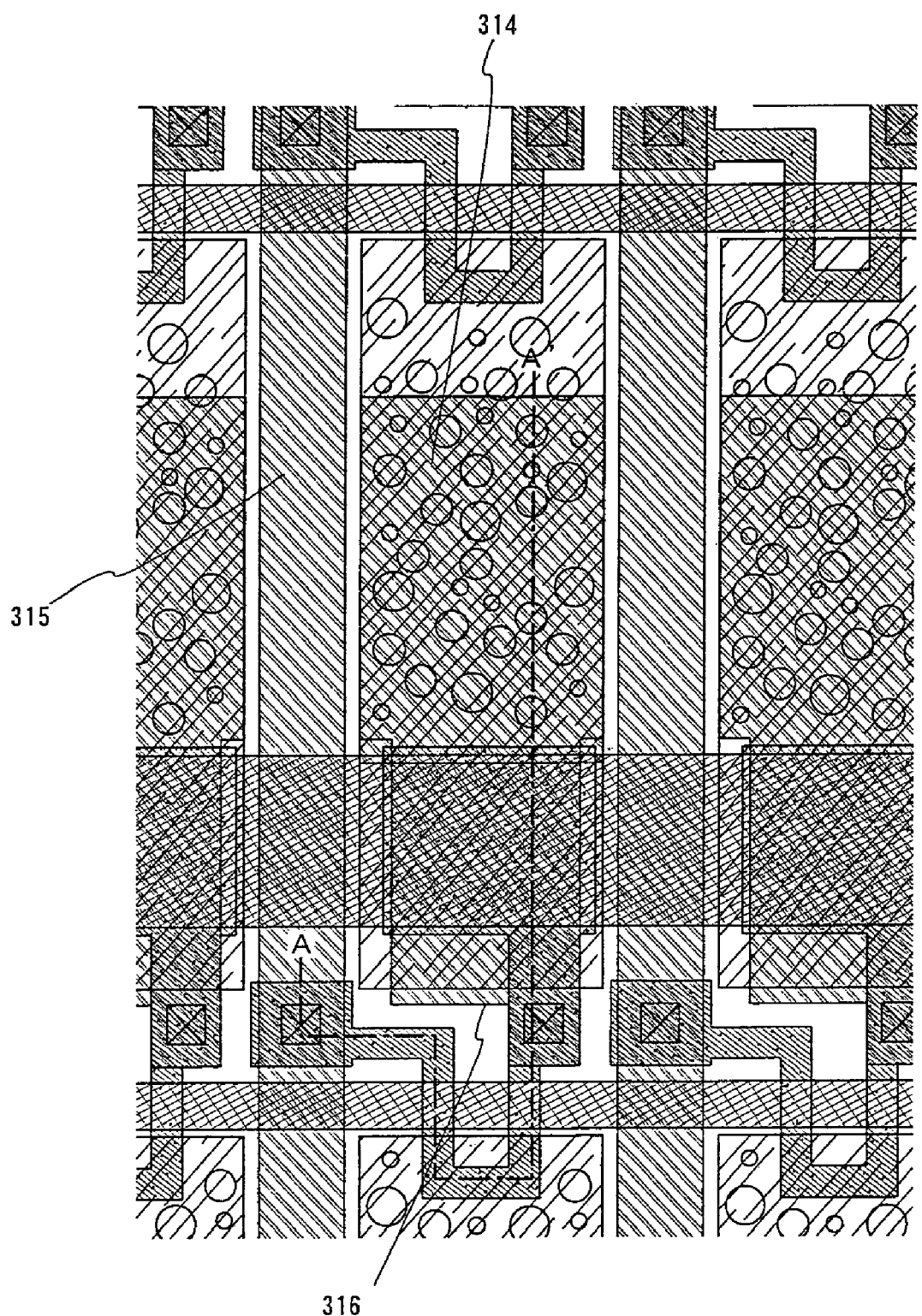
FIG. 7 is a view for explaining a step of fabricating the liquid crystal display device according to the invention.

When the reflecting electrode 314 and the wirings 315 and 316 have been formed thereby, the resist is removed and a structure shown by FIG. 3D is provided. Further, FIG. 7 shows a top view of the pixel in this case. In FIG. 7, a sectional view cut by a dotted line A-A' corresponds to FIG. 3D.

Further, by forming the reflecting electrode 314 above the transparent electrode 313, at portions of the transparent electrode 313 and the reflecting electrode 314 formed to overlap, light is reflected by the reflecting electrode 314 and at a portion at which the reflecting electrode 314 is not formed and the transparent electrode 313 is exposed to the surface, light transmits through an inner portion of the transparent electrode 313 and is emitted to a side of the substrate 301.

In this way, the pixel portion having the n-channel type TFT having the double gate structure and the hold capacitance and the drive circuit having the n-channel type TFT and the p-channel type TFT can be formed on the same substrate. In the specification, such a substrate is referred to as an active matrix substrate for convenience.

Further, the example is only an example and the invention is not naturally limited to steps of the embodiment. For example, as respective conductive films, a film of an element selected from the group constituting of tantalum (Ta), titanium (Ti), molybdenum (Mo), tungsten (W), chromium (Cr) and silicon (Si) or an alloy combined with the elements (representatively, Mo—W alloy, Mo—Ta alloy) can be used. Further, as the respective insulating films, a silicon oxide film, a silicon nitride film, a silicon oxynitride film, a film of an organic resin material (polyimide, acrylic resin, polyamide, polyimideamide, BCB (benzocyclobutene) etc) can be used.

Further, according to the steps shown in the example, the transparent electrode having the uneven shape can be formed on the surface formed in FIG. 3C and therefore, as shown by FIG. 3D, the surface of the reflection electrode formed on the transparent electrode 313 can be constituted by the uneven shape. The uneven shape is formed by carrying out the above-described processing at the transparent conductive film for forming the transparent electrode and therefore, the uneven shape can be formed without increasing photolithography steps or a number of photomasks.

As described above, by carrying out the embodiment, the surface of the reflection electrode can easily be constituted by the uneven shape and therefore, the optical recognizing performance of the display panel can be improved.

Embodiment 2

In this example, a method of fabricating a transflective type liquid crystal display device having a structure different from that of Example 1 will be explained in details in reference to FIG. 8A through FIG. 10.

Figure 8A:
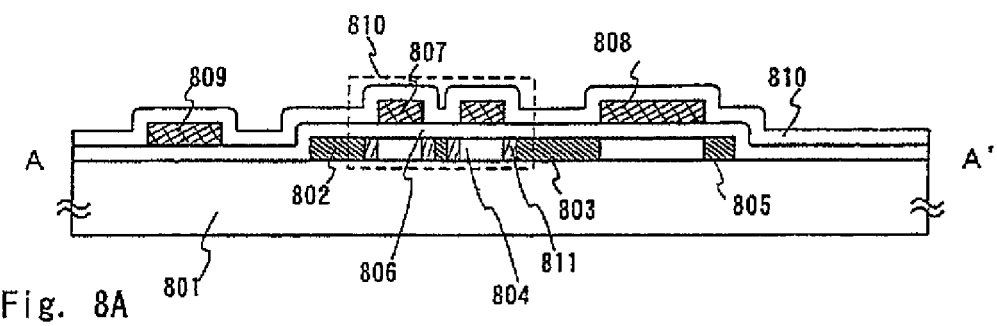
FIGS. 8A to 8D are views for explaining steps of fabricating the liquid crystal display device according to the invention.

First, as shown by FIG. 8A, an amorphous semiconductor film is formed on a substrate 801, the amorphous semiconductor film is crystallized and thereafter, a semiconductor layer 805 separated in an island-like shape by patterning is formed. Further, a gate insulating film 806 comprising an insulating film is formed on the semiconductor layer 805.

Further, a fabricating method until forming the gate insulating film 806 is similar to that shown by Example 1 and therefore, Example 1 may be referred. Further, similarly, an insulating film covering the semiconductor layer 805 is formed, thereafter, thermal oxidation is carried out and the gate insulating film 806 is formed.

Next, a channel doping step of adding a p-type and an n-type impurity element to a region for constituting a channel region of TFT at low concentration is carried out over an entire face thereof or selectively.

Further, by forming a conductive film on the gate insulating film 806 and patterning the conductive film, a gate electrode 807, a capacitance wiring 808 and a wiring 809 for constituting a source line can be formed. Further, a first conductive film according to the embodiment is formed by laminating TaN (tantalum nitride) formed by a thickness of 50 through 100 nm and W (tungsten) formed by a thickness of 100 through 400 nm.

Further, although the conductive film is formed by using the laminated film of TaN and W, the invention is not particularly limited thereto but the conductive film may be formed by an element selected from the group constituting of Ta, W, Ti, Mo, Al and Cu or an alloy material whose major component is constituted by the elements or a compound material. Further, a semiconductor film represented by a polycrystalline silicon film doped with an impurity element of phosphor or the like may be used.

Next, phosphor is added at a low concentration self-adjustingly by constituting a mask by the gate electrode 807 and the capacitance wiring 808. Concentration of phosphor at a region added with phosphor at low concentration is controlled to fall in a range of $1 \times 10^{16}$ through $5 \times 10^{18}/cm^3$, representatively, $3 \times 10^{17}$ through $3 \times 10^{18}/cm^3$.

Next, phosphor is added at high concentration by forming a mask (not illustrated) and a high concentration impurity region for constituting a source region 802 or a drain region 803 is formed. Concentration of phosphor at the high concentration impurity region is controlled to fall in a range of $1 \times 10^{20}$ through $1 \times 10^{21}/cm^3$ (representatively, $2 \times 10^{20}$ through $5 \times 10^{20}/cm^3$). Further, a region of the semiconductor layer 805 overlapping the gate electrode 807 constitutes a channel forming region 804 and a region covered by the mask becomes a low concentration impurity region to constitute an LDD region 811. Further, a region which is not covered by any of the gate electrode 807, the capacitance wiring 808 and the mask becomes the high concentration impurity region including the source region 802 and the drain region 803.

Further, also in the example, similar to Example 1, in order to form a p-channel type TFT in a drive circuit formed on a substrate the same as that of a pixel, the region for constituting an n-channel TFT is covered by a mask and boron is added to thereby form a source region or a drain region.

Figure 8B:
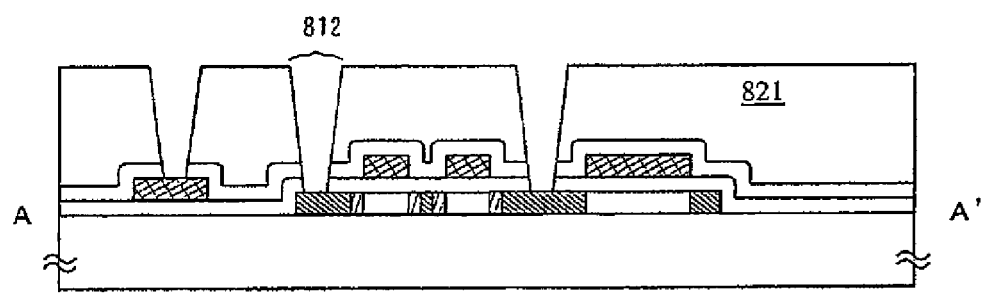

Next, after carrying out a hydrogenation treatment, a second insulating film comprising an organic region material is formed. Here, by using an acrylic resin film having a film thickness of 1 μm, a surface of the second insulating film 821 can be flattened. Thereby, influence of a stepped difference produced by the pattern formed at a later below the second insulating film 821 can be prevented. Successively, a mask is formed on the second insulating film 821, a contact hole 812 reaching the semiconductor layer 805 is formed by etching (FIG. 8B). Further, after forming the contact hole 812, the mask is removed.

Next, after forming a transparent conductive film (here, indium tin oxide (ITO) film) of 120 nm by a sputtering method, a heating treatment at 200° C. for 60 minutes is carried out by a clean oven. Thereby, an amorphous state and a crystalline state can be mixed in the formed amorphous transparent conductive film. The film is patterned in a rectangular shape by using a photolithography technology. Further, after carrying out a wet etching treatment, the mask is removed.

Next, the surface of the transparent conductive film is polished by a CMP method. Here, the treatment is carried out by utilizing the fact that a polishing rate significantly differs between the amorphous portion and the crystalline portion mixed in the ITO film and therefore, grains in the crystalline state present at the surface of the transparent conductive film can be made to remain and a portion in the amorphous state can particularly be removed selectively.

According to the embodiment, a polishing pad (in the specification, hereinafter, generally referred to as pad) is pasted on a platen or a polishing plate, a polishing face of the substrate is pressed to the pad on the platen by constant pressure and the platen and the substrate are respectively rotated or locked while supplying slurry between the ITO film formed on the substrate and the pad to thereby polish the surface of the work or the surface of the ITO film by chemical and mechanical composite operation. Further, as the slurry, ammonia water including silica grains having a grain size of about 120 nm is used and supplied at a flow rate of 100 cc/min. Further, a revolution number of the platen is set to 30 rpm, a revolution number of the substrate is set to 30 rpm, polishing pressure in polishing is set to 300 g/cm² and the polishing is carried out for a polishing time period of 0.3 min.

Next, etching is carried out by coating an acidic solution on the surface of the transparent conductive film. Further, according to the example, as the acidic solution, 0.5% hydrofluoric acid is used and etching is carried out by coating the chemical solution by the spin coating method. Further, although as a time period of etching by the chemical solution, the etching can be carried out by 15 sec or shorter, according to the embodiment, the period is set to 5 sec. Further, thereafter, by cleaning the surface of the substrate by using pure water, the acidic solution is removed.

Figure 8C:
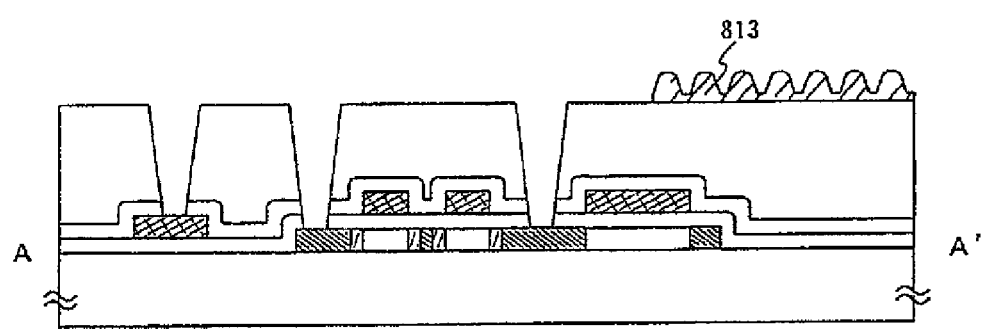
Figure 9:
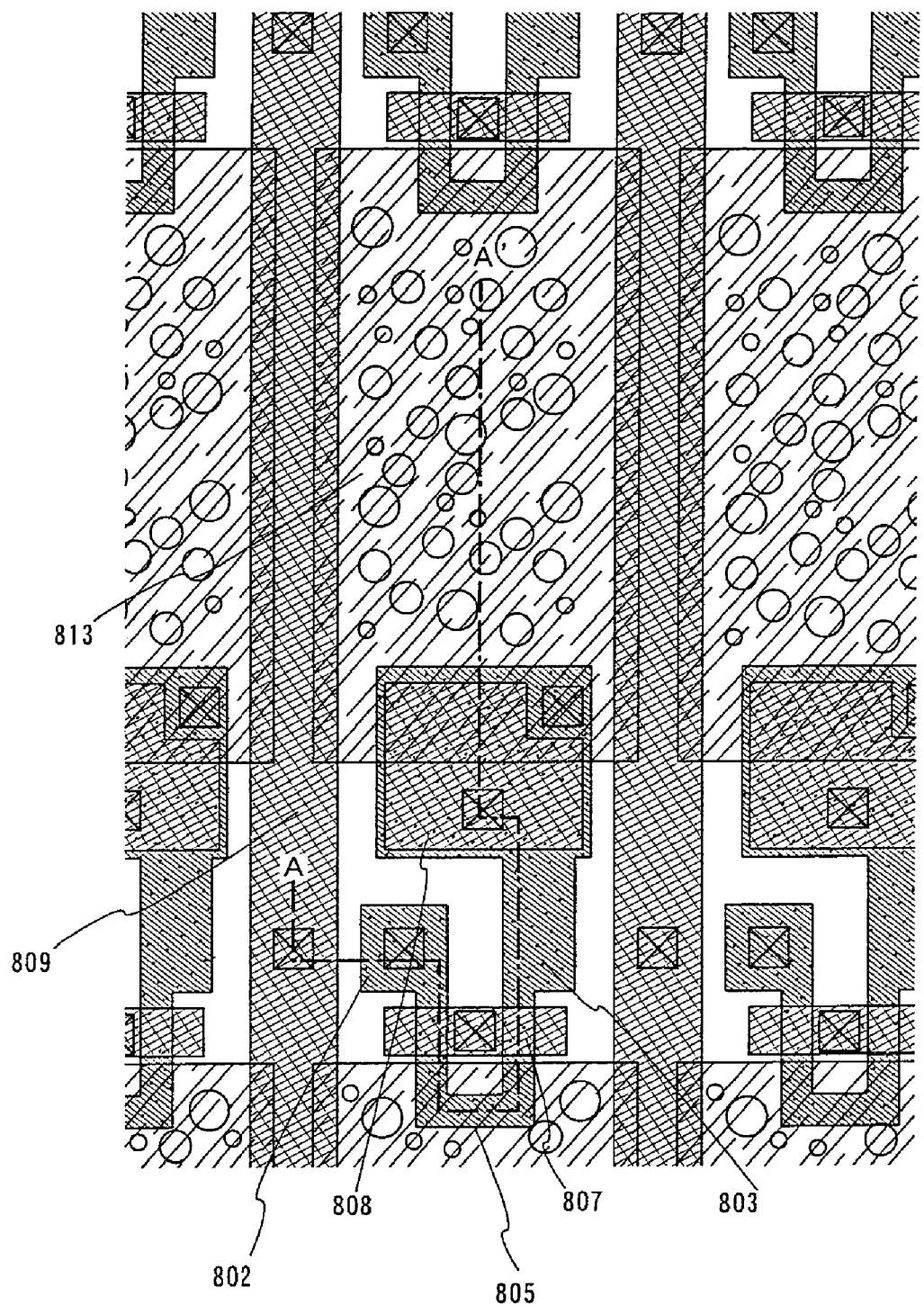
FIG. 9 is a view for explaining a step of fabricating the liquid crystal display device according to the invention.

By the above-described, a transparent electrode 813 comprising the transparent conductive film having an uneven shape at the surface can be formed (FIG. 8C). Further, FIG. 9 shows a top view of the pixel in this case. In FIG. 9, a sectional view cut by a dotted line A-A' corresponds to FIG. 8C.

Next, by forming a second conductive film and patterning the conductive film, other than a reflecting electrode 814 formed on the transparent electrode 813, a wiring 815 for electrically connecting the wiring (source line) 809 and the source region of TFT 810, a wiring 816 for forming a contact to the drain region of TFT 810 and a wiring 817 for electrically connecting the drain region of TFT 810 and the transparent electrode 813 are formed. Further, the second conductive film formed here is the reflective conductive film for forming the electrode according to the embodiment and it is preferable to use a metal material including aluminum, silver or a metal material including these therefor.

According to the embodiment, as the second conductive film, a laminated film having a two-layers structure is formed continuously by a Ti film by 50 nm and an aluminum film including Si by 500 nm by a sputtering method.

Further, the reflecting electrode 814 and the wirings 815, 816 and 817 are formed by using a photolithography technology as a patterning method. Here, a dry etching method is used as an etching method.

Figure 8D:
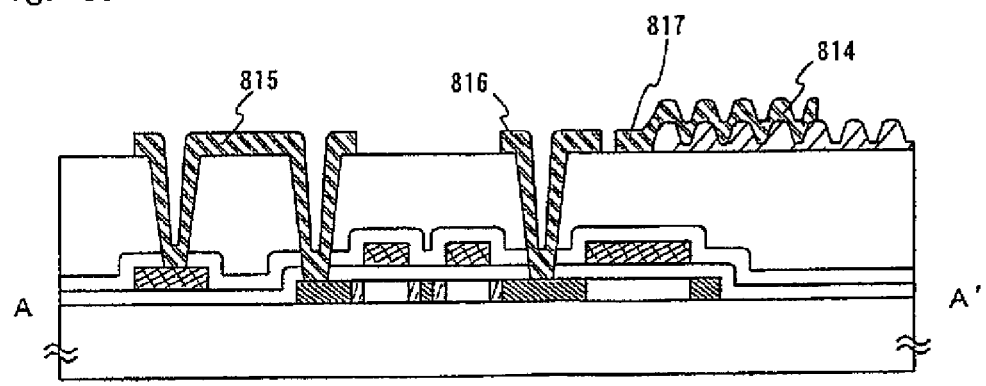
Figure 10:
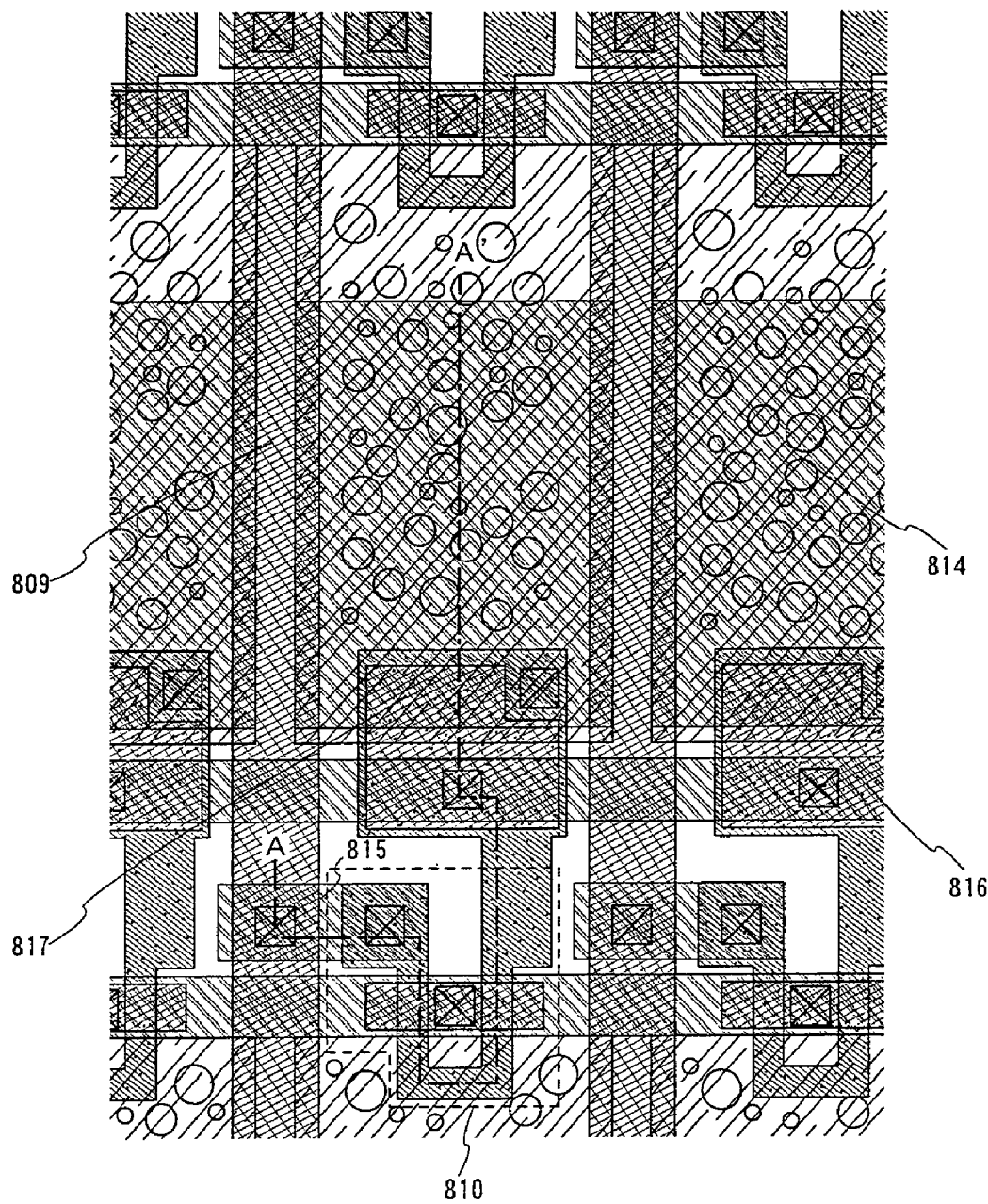
FIG. 10 is a view for explaining a step of fabricating the liquid crystal display device according to the invention.

By the above-described, when the reflection electrode 814 and the wirings 815, 816 and 817 have been formed, the resist is removed to provide a structure shown by FIG. 8D. Further, FIG. 10 shows a top view of the pixel in this case. In FIG. 10, the sectional view cut by a dotted line A-A' corresponds to FIG. 8D.

Further, as shown by FIG. 10, by forming the reflecting electrode 814 on the transparent electrode 813, the portions of the transparent electrode 813 and the reflecting electrode 814 formed to overlap, light is reflected by the reflecting electrode 814 and at a portion at which the reflection electrode 814 is not formed and the transparent electrode 813 is exposed to surface, light transmits through an inner portion of the transparent electrode 813 and is emitted to a side of the substrate 801.

As described above, also in the embodiment, an active matrix substrate having the pixel portion having the n-channel type TFT having the double gate structure and the storage capacitor and the drive circuit having the n-channel type TFT and the p-channel type TFT on the same substrate is formed.

Further, according to steps shown by the embodiment, the transparent electrode having the uneven shape can be formed on the surface formed in FIG. 8C and therefore, as shown by FIG. 8D, also the surface of the reflection electrode formed on the transparent electrode 313 can be constituted by the uneven shape. The uneven shape is formed by carrying out the above-described processing at the transparent conductive film forming the transparent electrode and therefore, the uneven shape can be formed without increasing photolithography steps or a number of photomasks.

Thereby, the surface of the reflection electrode can easily be constituted by the uneven shape by carrying out the example, and therefore, the optical recognizing performance of the display panel can be improved.

Example 3

According to the example, steps of fabricating a transflective type liquid crystal display device from the active matrix substrate fabricated by Example 1 will be explained as follows. A sectional view of FIG. 11 is used for explanation.

Figure 11:
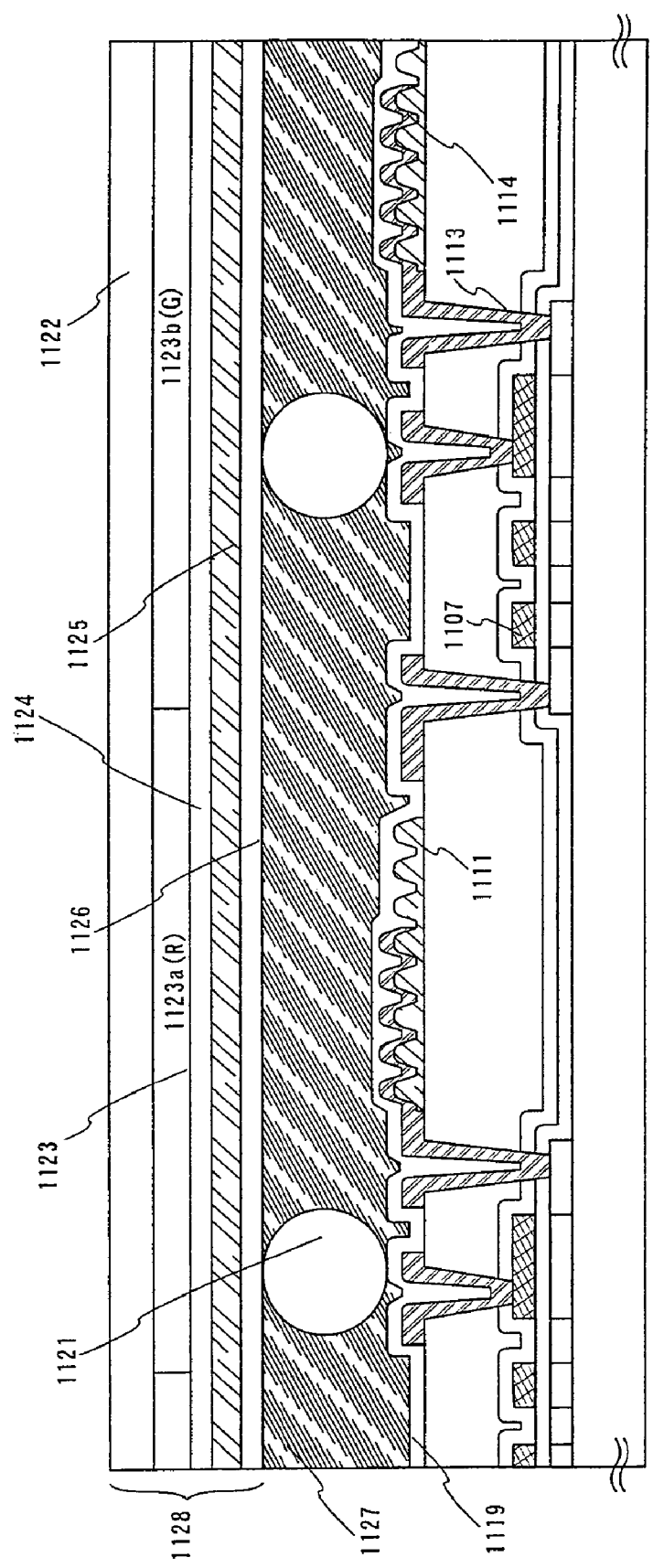
FIG. 11 is a view for explaining a structure of the liquid crystal display device according to the invention.

First, after providing the active matrix substrate of FIG. 3D in accordance with the example 1, as shown by FIG. 11, an alignment film 1119 is formed on the active matrix substrate and rubbing treatment is carried out. Further, according to the example, after forming the alignment film 1119, spherical spacers 1121 for holding an interval between the substrates are scattered over entire surfaces of the substrates. Further, in place of the spherical spacers 1121, column-like spacers may be formed at desired positions by patterning an organic resin film of an acrylic resin film or the like.

Next, a substrate 1122 is prepared. A coloring layer 1123 (1123a, 1123b) and a flattening layer 1124 are formed on the substrate 1122. Further, as the coloring layer 1123, a coloring layer 1123a of red color, a coloring layer 1123b of blue color and a coloring layer of green color (not illustrated) are formed. Further, although not illustrated here, a light blocking portion may be formed by partially overlapping the coloring layer 1123a of the red color and the coloring layer 1123b of the blue color or partially overlapping the coloring layer 1123a of the red color and the coloring layer of the green color (not illustrated).

Further, an opposed electrode 1125 comprising a transparent conductive film is formed on the flattening film 1124 at a position for constituting a pixel portion, an alignment film 1126 is formed over an entire face of the substrate 1122 and rubbing treatment is carried out to thereby provide an opposed substrate 1128.

Further, the active matrix substrate formed with the alignment film 1119 on the surface and the opposed substrate 1128 are pasted together by a seal agent (not illustrated). The seal agent is mixed with a filler and two sheets of the substrates are pasted together with a uniform interval (preferably, 2.0 through 3.0 μm) therebetween by the filler and the spherical spacers. Thereafter, a liquid crystal material 1127 is injected between the two substrates and completely sealed by a seal agent (not illustrated). A publicly-known liquid crystal material may be used for the liquid crystal material 1127. In this way, the transflective type liquid crystal display device shown in FIG. 11 is finished. Further, as necessary, the active matrix substrate or the opposed substrate 1128 is divided to cut in a desired shape. Further, polarizers and the like are pertinently provided by using a publicly-known technology. Further, FPC is pasted thereto by using the publicly-known technology.

Figure 15:
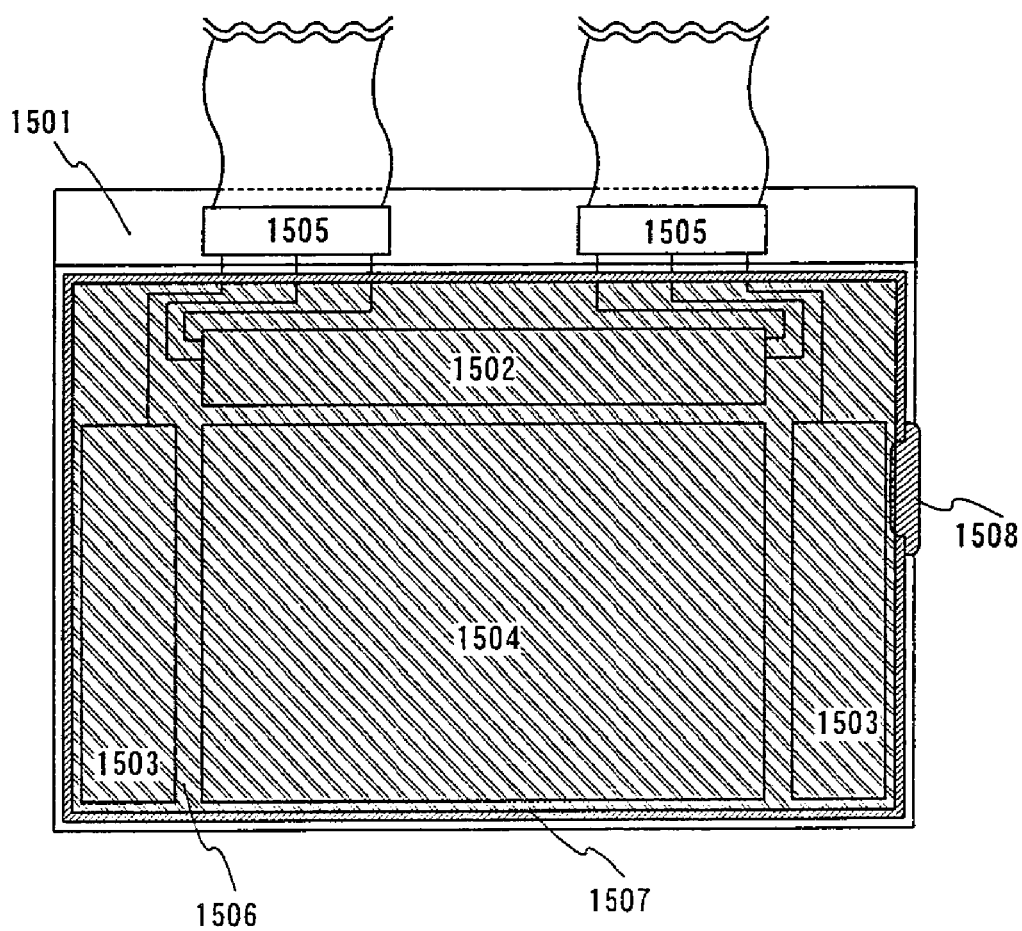
FIG. 15 is a view for explaining a circuit constitution capable of being used in the invention.

The constitution of the liquid crystal module provided in this way will be explained in reference to a top view of FIG. 15. A pixel portion 1504 is arranged at the center of an active matrix substrate 1501. A source signal line drive circuit 1502 for driving a source signal line is arranged on an upper side of the pixel portions 1504. Gate signal line drive circuits 1503 for driving gate signal lines are arranged on the left and on the right of the pixel portion 1504. Although according to an example shown by the example, the gate signal line drive circuits 1503 are symmetrically arranged on the left and on the right of the pixel portion, the gate signal line drive circuit 1503 may be arranged to only one side thereof and a designer may pertinently select the side in consideration of a substrate size of the liquid crystal module or the like. However, the left and right symmetric arrangement shown in FIG. 15 is preferable in consideration of operational reliability and drive efficiency of circuit.

Signals are inputted to respective drive circuits from flexible print circuits (FPC) 1505. According to FPC 1505, after opening contact holes at an interlayer insulating film and a resin film to reach a wiring arranged at a predetermined location of the substrate 1501 and forming a connection electrode (not illustrated), FPC 1505 is pressed thereto via an anisotropic conductive film or the like. According to the example, the connection electrode is formed by using ITO.

At surroundings of the drive circuit and the pixel portion, a seal agent 1507 is coated along the outer periphery of the substrate and an opposed substrate 1506 is pasted in a state of maintaining a constant gap (interval between the substrate 1501 and the opposed substrate 1506) by spacers previously formed on the active matrix substrate. Thereafter, liquid crystal elements are injected from portions at which the seal agent 1507 is not coated and the substrates are hermetically sealed by a seal agent 1508. The liquid crystal module is finished by the above-described steps. Further, although an example of forming all the drive circuits on the substrates is shown here, several pieces of ICs may be used at portions of the drive circuit. Thereby, the active matrix type liquid crystal display device is finished.

Example 4

Figure 16:
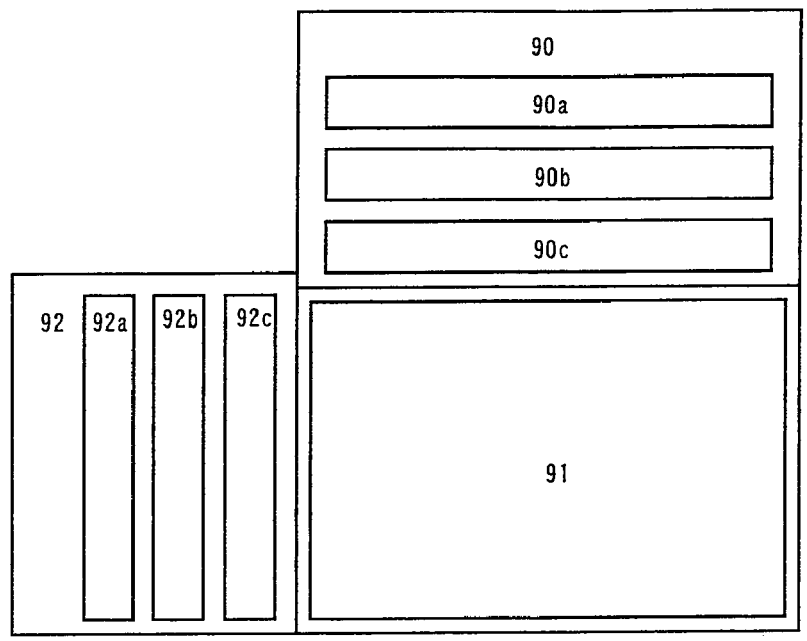
FIG. 16 is a view for explaining a circuit constitution capable of being used in the invention.
Figure 17:
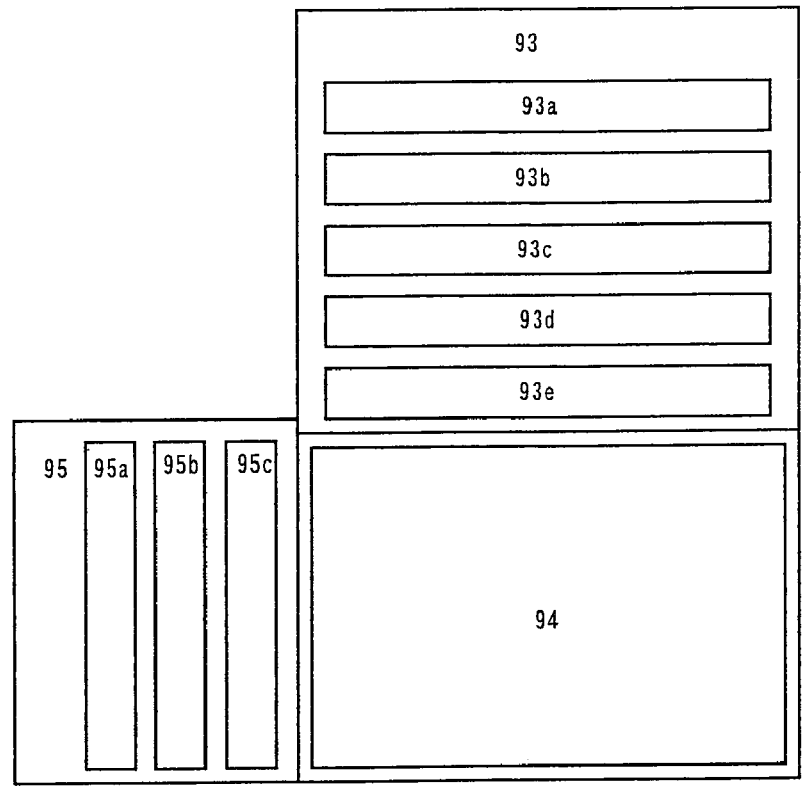
FIG. 17 is a view for explaining an outlook of the liquid crystal display device according to the invention.

FIGS. 16 and 17 show block diagrams in electro-optic device fabricated by using the invention. Further, FIG. 16 shows a circuit constitution for carrying out analog driving. The embodiment shows an electro-optic device having a source side drive circuit 90, a pixel portion 91 and a gate side drive circuit 92. Further, in the specification, the drive circuit generally refers to the source side drive circuit and the gate side drive circuit.

The source side drive circuit 90 is provided with a shift register 90a, a buffer 90b, and a sampling circuit (transfer gate) 90c. Further, the gate side drive circuit 92 is provided with a shift register 92a, a level shifter 92b and a buffer 92c. Further, as necessary, a level shifter circuit may be provided between the sampling circuit and the shift register.

Further, the pixel portion 91 comprises a plurality of pixels and each of the plurality pixels includes a TFT element.

Further, although not illustrated, a gate side drive circuit may be provided further on a side opposed to the gate side drive circuit 92 interposing the pixel portion 91.

Further, in carrying out digital driving, as shown by FIG. 17, in place of the sampling circuit, a latch (A) 93b and a latch (B) 93c may be provided. A source side drive circuit 93 is provided with a shift register 93a, the latch (A) 93b, the latch (B) 93c, a D/A converter 93d and a buffer 93e. Further, a gate side drive circuit 95 is provided with a shift register 95a, a level shifter 95b and a buffer 95c. Further, as necessary, a level shifter circuit may be provided between the latch (B) 93c and the D/A converter 93d.

Further, the above-described constitution can be realized in accordance with fabricating steps shown in Example 1 or Example 2. Further, although according to the embodiment, only the constitutions of the pixel portion and the drive circuit are shown, a memory or a microprocessor can be formed in accordance with fabricating steps of the invention.

Embodiment 5

The transflective type liquid crystal display device fabricated by carrying out the invention can be used in various electro-optic device. Further, the invention is applicable to all the electric device integrated with the electro-optic device as display media.

As electric device fabricated by using the liquid crystal display device fabricated by the invention, there are pointed out a video camera, a digital camera, a navigation system, a voice reproducing device (car audio, audio component), a notebook type personal computer, a game machine, a portable information terminal (mobile computer, portable telephone, portable game machine or electronic book), device reproducing record media of image reproducing device having record media (specifically, digital video disk (DVD)) and having display device capable of displaying the image. FIGS. 18A, 18B, 18C, 18D, 18E and 18F show specific examples of the electric device.

Figure 18A:
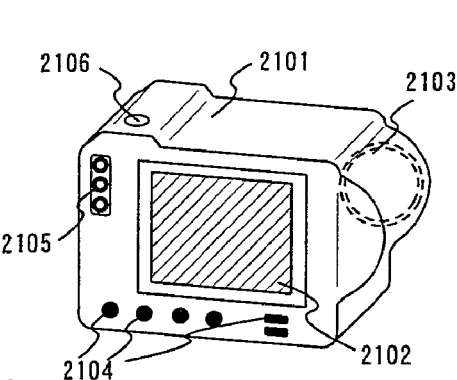
FIGS. 18A to 18F are views showing examples of electric device.

FIG. 18A is a digital still camera which includes a main body 2101, a display portion 2102, an image receiving portion 2103, an operation key 2104 and an outside connection port 2105 and a shutter 2106. The digital still camera is fabricated by using the liquid crystal display device fabricated by the invention at the display portion 2102.

Figure 18B:
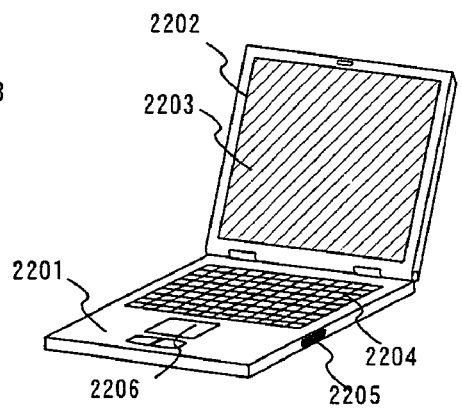

FIG. 18B is a notebook type personal computer which includes a main body 2201, a cabinet 2202, a display portion 2203, a keyboard 2204, an outside connection port 2205 and a pointing mouse 2206. The notebook type personal computer is fabricated by using the liquid crystal display device fabricated by the invention at the display portion 2203.

Figure 18C:
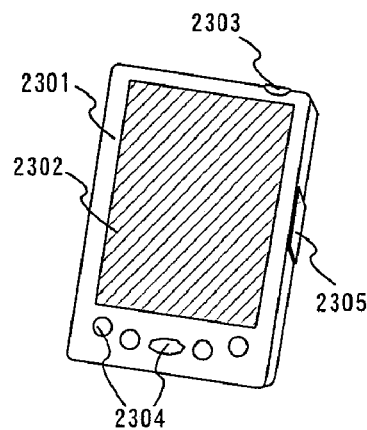

FIG. 18C shows a mobile computer which includes a main body 2301, a display portion 2302, a switch 2303, an operation key 2304 and an infrared ray port 2305. The mobile computer is fabricated by using the liquid crystal display device fabricated by the invention at the display portion 2302.

Figure 18D:
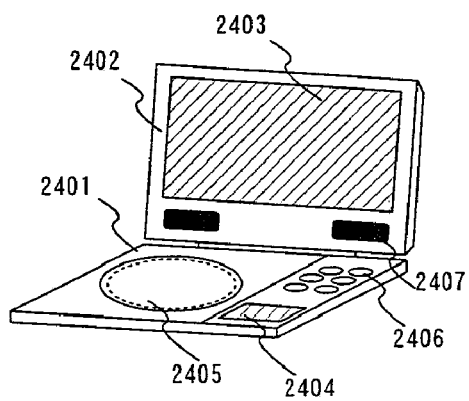

FIG. 18D shows a portable image reproducing device having a record medium (specifically, DVD reproducing device) which includes a main body 2401, a cabinet 2402, a display portion A 2403, a display portion B 2404, a record medium (DVD etc) reading portion 2405, an operation key 2406, and a speaker portion 2407. The display portion A 2403 mainly displays image information, the display portion B 2404 mainly displays character information and the portable image reproducing device is fabricated by using the liquid crystal display device fabricated by the invention at the display portions A, B 2403, 2404. Further, the image reproducing device having the record media include a game machine for household use.

Figure 18E:
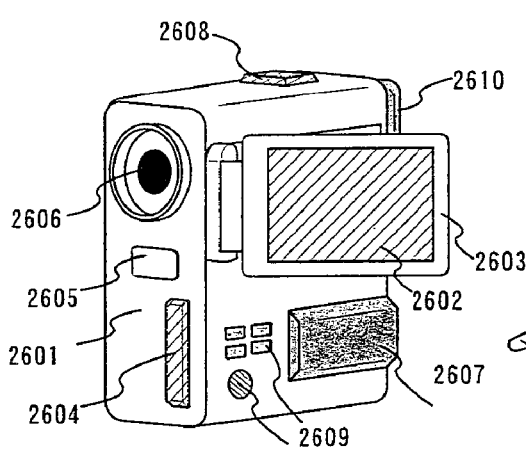

FIG. 18E shows a video camera which includes a main body 2601, a display portion 2602, a cabinet 2603, an outside connection port 2604, a remote control receiving portion 2605, an image receiving portion 2606, a battery 2607, a voice input portion 2608, an operation key 2609 and an eyepiece portion 2610. The video camera is fabricated by using the liquid crystal display device fabricated by the invention at the display portion 2602.

Figure 18F:
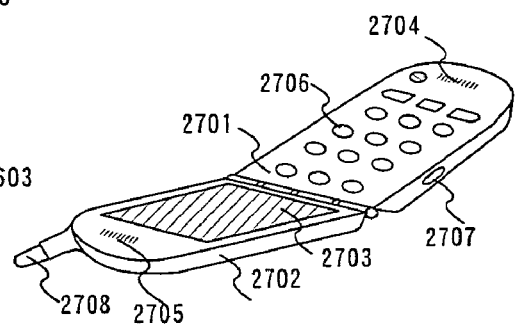

Here, FIG. 18F shows a portable telephone which includes a main body portion 2701, a cabinet 2702, a display portion 2703, a voice input portion 2704, a voice output portion 2705, an operation key 2706, an outside connection port 2707 and an antenna 2708. The portable telephone is fabricated by using the liquid display device fabricated by the invention at the display portion 2703. Further, the display portion 2703 can restrain power consumption of the portable telephone by displaying a character of white color on the background of black color.

As described above, the range of applying the liquid crystal display device fabricated by the invention is extremely wide and electric device in all the fields can be fabricated. Further, the electric device of the embodiment can be made by using the liquid crystal display device fabricated by carrying out Example 1 through Example 4.

By the above-described, by carrying out the invention, in fabricating the transflective type liquid crystal display device, the surface of the transparent electrode constituting the pixel electrode can be constituted by the uneven shape and also the surface of the reflection electrode can be constituted by the uneven shape. Thereby, photolithography steps and the masks used in patterning which are needed for forming the uneven shape on the surface of the pixel electrode can be reduced. Therefore, not only the optical recognizing performance of display can be improved but also considerable cost reduction and promotion of productivity can be realized in comparison with the method of fabricating the uneven structure of the related art.

What is claimed is:

1. A liquid crystal display device comprising:
 a drive circuit over a substrate;
 a pixel portion over the substrate and comprising:
  a thin film transistor formed over the substrate;
  an insulating film formed over the thin film transistor;
  a transparent electrode on a surface of the insulating film; and
  a reflection electrode formed on the transparent electrode,
 wherein the transparent electrode has an uneven surface with respect to the substrate,
 wherein an entirety of a bottom surface of the transparent electrode is in contact with the surface of the insulating film,
 wherein the uneven surface of the transparent electrode is more uneven than the surface of the insulating film, and
 wherein the thin film transistor is electrically connected to the transparent electrode and the reflection electrode.

2. A liquid crystal display device according to claim 1, wherein the transparent electrode having the uneven surface is formed by forming an amorphous transparent conductive film over the substrate, forming a crystalline portion in the amorphous transparent conductive film, and removing an amorphous portion at a surface of the transparent conductive film including the crystalline portion.

3. A liquid crystal display device according to claim 1, wherein the transparent electrode having the uneven surface is formed by forming an amorphous transparent conductive film over the substrate, forming a crystalline portion in the amorphous transparent conductive film by sintering, and removing an amorphous portion at a surface of the transparent conductive film including the crystalline portion by etching.

4. A liquid crystal display device according to claim 3, wherein the sintering step is conducted at 150 through 200° C.

5. A liquid crystal display device according to claim 3, wherein the etching step is conducted by using one or a plural kinds of acidic solution selected from the group constituting of hydrofluoric acid, nitric acid, sulfuric acid, and hydrochloric acid.

6. A liquid crystal display device according to claim 1, wherein the transparent electrode having the uneven surface is formed by forming an amorphous transparent conductive film over the substrate, forming a crystalline portion in the amorphous transparent conductive film by sintering, polishing the transparent conductive film including the crystalline portion, and etching the transparent conductive film including the crystalline portion.

7. A liquid crystal display device according to claim 6, the polishing step is conducted by CMP.

8. A liquid crystal display device according to claim 1, wherein a rate of an area occupied by the reflection electrode is 50 through 90% of an area occupied by the transparent electrode.

9. A liquid crystal display device according to claim 1, wherein the liquid crystal display device is incorporated into an electronic device selected from the group constituting of a digital still camera, a notebook type personal computer, a mobile computer, a portable image reproducing device having a record medium, a video camera, and a portable telephone.

10. A liquid crystal display device comprising:
a drive circuit over a first substrate; and
a pixel portion over the first substrate comprising:
a thin film transistor;
an insulating film formed over the thin film transistor;
a first transparent electrode on a surface of the insulating film;
a reflection electrode formed on the first transparent electrode;
a liquid crystal over the first transparent electrode and the reflection electrode;
a second transparent electrode over the liquid crystal; and
a second substrate over the second transparent electrode,
wherein the first transparent electrode has an uneven surface with respect to the first substrate,
wherein an entirety of a bottom surface of the first transparent electrode is in contact with the surface of the insulating film,
wherein the uneven surface of the first transparent electrode is more uneven than the surface of the insulating film, and
wherein the thin film transistor is electrically connected to the first transparent electrode and the reflection electrode.

11. A liquid crystal display device according to claim 10, wherein the first transparent electrode having the uneven surface is formed by forming an amorphous transparent conductive film over a substrate, forming a crystalline portion in the amorphous transparent conductive film, and removing an amorphous portion at a surface of the transparent conductive film including the crystalline portion.

12. A liquid crystal display device according to claim 10, wherein the first transparent electrode having the uneven surface is formed by forming an amorphous transparent conductive film over a substrate, forming a crystalline portion in the amorphous transparent conductive film by sintering, and removing an amorphous portion at a surface of the transparent conductive film including the crystalline portion by etching.

13. A liquid crystal display device according to claim 12, wherein the sintering step is conducted at 150 through 200° C.

14. A liquid crystal display device according to claim 12, wherein the etching step is conducted by using one or a plural kinds of acidic solution selected from the group constituting of hydrofluoric acid, nitric acid, sulfuric acid, and hydrochloric acid.

15. A liquid crystal display device according to claim 10, wherein the first transparent electrode having the uneven surface is formed by forming an amorphous transparent conductive film over a substrate, forming a crystalline portion in the amorphous transparent conductive film by sintering, polishing the transparent conductive film including the crystalline portion, and etching the transparent conductive film including the crystalline portion.

16. A liquid crystal display device according to claim 15, the polishing step is conducted by CMP.

17. A liquid crystal display device according to claim 10, wherein a rate of an area occupied by the reflection electrode is 50 through 90% of an area occupied by the first transparent electrode.

18. A liquid crystal display device according to claim 10, wherein the liquid crystal display device is incorporated into an electronic device selected from the group constituting of a digital still camera, a notebook type personal computer, a mobile computer, a portable image reproducing device having a record medium, a video camera, and a portable telephone.

19. A liquid crystal display device comprising:
a drive circuit over a first substrate; and
a pixel portion over the first substrate comprising:
a thin film transistor;
an insulating film formed over the thin film transistor;
a first transparent electrode on a surface of the insulating film;
a reflection electrode formed on the first transparent electrode;
a liquid crystal over the first transparent electrode and the reflection electrode;
a second transparent electrode over the liquid crystal;
a first color filter above the second transparent electrode;
a second color filter above the second transparent electrode; and
a second substrate over the first color filter and the second color filter,
wherein the first transparent electrode has an uneven surface with respect to the first substrate,
wherein an entirety of a bottom surface of the first transparent electrode is in contact with the surface of the insulating film,
wherein the uneven surface of the first transparent electrode is more uneven than the surface of the insulating film,
wherein the thin film transistor is electrically connected to the first transparent electrode and the reflection electrode and wherein an end portion of the first color filter is overlapped with an end portion of the second color filter.

20. A liquid crystal display device according to claim 19, wherein the first transparent electrode having the uneven surface is formed by forming an amorphous transparent conductive film over a substrate, forming a crystalline portion in the amorphous transparent conductive film, and removing an amorphous portion at a surface of the transparent conductive film including the crystalline portion.

21. A liquid crystal display device according to claim 19, wherein the first transparent electrode having the uneven surface is formed by forming an amorphous transparent conductive film over a substrate, forming a crystalline portion in the amorphous transparent conductive film by sintering, and removing an amorphous portion at a surface of the transparent conductive film including the crystalline portion by etching.

22. A liquid crystal display device according to claim 21, wherein the sintering step is conducted at 150 through 200° C.

23. A liquid crystal display device according to claim 21, wherein the etching step is conducted by using one or a plural kinds of acidic solution selected from the group constituting of hydrofluoric acid, nitric acid, sulfuric acid, and hydrochloric acid.

24. A liquid crystal display device according to claim 19, wherein the first transparent electrode having the uneven surface is formed by forming an amorphous transparent conductive film over a substrate, forming a crystalline portion in the amorphous transparent conductive film by sintering, polishing the transparent conductive film including the crystalline portion, and etching the transparent conductive film including the crystalline portion.

25. A liquid crystal display device according to claim 24, the polishing step is conducted by CMP.

26. A liquid crystal display device according to claim 19, wherein a rate of an area occupied by the reflection electrode is 50 through 90% of an area occupied by the first transparent electrode.

27. A liquid crystal display device according to claim 19, wherein the liquid crystal display device is incorporated into an electronic device selected from the group constituting of a digital still camera, a notebook type personal computer, a mobile computer, a portable image reproducing device having a record medium, a video camera, and a portable telephone.

28. A liquid crystal display device according to claim 1 further comprising:
    a liquid crystal over the transparent electrode and the reflection electrode;
    a first color filter over the liquid crystal; and
    a second color filter over the liquid crystal,
    wherein an end portion of the first color filter is overlapped with an end portion of the second color filter.

29. A liquid crystal display device according to claim 1, wherein the drive circuit is a gate signal line drive circuit.

30. A liquid crystal display device according to claim 10, wherein the drive circuit is a gate signal line drive circuit.

* * * * *